United States Patent
Masui et al.

(10) Patent No.: US 7,791,634 B2
(45) Date of Patent: Sep. 7, 2010

(54) PIXEL CLOCK GENERATOR, PULSE MODULATOR, AND IMAGE FORMING APPARATUS

(75) Inventors: Naruhiro Masui, Ohta-ku (JP); Hidetoshi Ema, Ohta-ku (JP); Nobunari Tsukamoto, Ohta-ku (JP)

(73) Assignee: Ricoh Company, Limited, Tokyo (JP)

( * ) Notice: Subject to any disclaimer, the term of this patent is extended or adjusted under 35 U.S.C. 154(b) by 418 days.

(21) Appl. No.: 11/793,594

(22) PCT Filed: Apr. 20, 2006

(86) PCT No.: PCT/JP2006/308794

§ 371 (c)(1),
(2), (4) Date: Jun. 21, 2007

(87) PCT Pub. No.: WO2006/115282

PCT Pub. Date: Nov. 2, 2006

(65) Prior Publication Data

US 2008/0143814 A1    Jun. 19, 2008

(30) Foreign Application Priority Data

Apr. 26, 2005  (JP) .............................. 2005-128390

(51) Int. Cl.
*B41J 2/435* (2006.01)
(52) U.S. Cl. ..................................... 347/249
(58) Field of Classification Search ................ 347/229, 347/232, 234–235, 237, 247–250
See application file for complete search history.

(56) References Cited

U.S. PATENT DOCUMENTS

| | | | |
|---|---|---|---|
| 6,927,789 B2 * | 8/2005 | Ozasa et al. | 347/249 |
| 7,586,510 B2 * | 9/2009 | Maeda | 347/232 |
| 2005/0099489 A1 | 5/2005 | Nihei et al. | |
| 2007/0206234 A1 * | 9/2007 | Ozasa et al. | 358/471 |

FOREIGN PATENT DOCUMENTS

| | | |
|---|---|---|
| EP | 1 119 185 | 7/2001 |
| JP | 02 221974 | 9/1990 |
| JP | 2004-262101 | 9/2004 |

OTHER PUBLICATIONS

U.S. Appl. No. 11/845,416, filed Aug. 27, 2007, Tsukamoto, et al.

* cited by examiner

*Primary Examiner*—Hai C Pham
(74) *Attorney, Agent, or Firm*—Oblon, Spivak, McClelland, Maier & Neustadt, L.L.P.

(57) ABSTRACT

A comparator compares a time interval between a first synchronization signal and a second synchronization signal with a target value, and outputs an error therebetween. A frequency calculator calculates a set value of a pixel clock frequency based on the error output from the comparator, and outputs a frequency specification signal for specifying a pixel clock frequency according to the calculated set value. A frequency divider divides a high frequency clock generated by a high frequency clock generator by a frequency division ratio based on the frequency specification signal output from the frequency calculator, and generates the pixel clock.

9 Claims, 27 Drawing Sheets

PIXEL CLOCK GENERATOR, PULSE MODULATOR, AND IMAGE FORMING APPARATUS

TECHNICAL FIELD

The present invention relates to a pixel clock generator, a pulse modulator, and an image forming apparatus.

BACKGROUND ART

FIG. 28 is a general schematic diagram of a conventional image forming apparatus. The image forming apparatus shown in FIG. 28 is a laser printer or a digital copier. A laser beam emitted from a semiconductor laser unit 1009 is scanned by a rotating polygon mirror 1003, to form a beam spot on a photosensitive element 1001 which is a medium to be scanned through a scanning lens 1002, and exposes the photosensitive element 1001 to form an electrostatic latent image thereon. At this time, a photodetector 1004 detects a scanning beam in each line.

A phase synchronization circuit 1006 receives a clock from a clock generation circuit 1005, generates an image clock (pixel clock) of which phase is synchronized in each line, and supplies the image clock to an image processing unit 1007 and a laser drive circuit 1008. The semiconductor laser unit 1009 controls an emission time of a semiconductor laser according to the image data formed by the image processing unit 1007 and to an image clock of which phase is set for each line by the phase synchronization circuit 1006, and formation of the electrostatic latent image on the photosensitive element 1001 is thereby controlled.

In such a scanning optical system, variations of scanning speed cause fluctuations in an image, which leads to degradation of image quality. Particularly, in a color image, a dot offset of each color occurs in a main scanning direction, which leads to color shift, and the color shift causes degradation of color reproduction and degradation of resolution. Therefore, to obtain a high quality image, it is essential to correct the scanning speed variations.

The scanning speed variations (error) are roughly classified into those as follows. Each main factor of them is explained below.

(1) Error of Each Facet of Polygon Mirror (for Each Scanning Line) (Hereinafter, "Error of Each Facet" as Necessary)

A factor causing the scanning speed variations includes fluctuation in distance from a rotating axis of a polarized reflective surface of a polarizer such as a polygon mirror. In other words, the factor includes eccentricity of the polygon mirror, and facet precision of the facets of the polygon mirror. This type of error is an error with a periodicity of several lines, for example, the number of lines for the number of facets of a polygon mirror.

(2) Error Due to Variations in Average Scanning Speed

The average scanning speed indicates an average of scanning speed for each facet of the polygon mirror. A factor causing such scanning speed variations includes variations in rotational speed of the polygon mirror, and variations in a scanning optical system due to various environmental changes such as temperature, humidity, and vibration. The factor also includes variations in scanning speed due to chromatic aberration in a scanning optical system because an emission wavelength of a semiconductor laser, which is a light source, is changed caused by temperature variations or the like. These types of error are comparatively moderate variations.

(3) Error of Each Light Source

This type of error includes scanning speed variations which occur in a multi-beam optical system that has a plurality of light sources such as a semiconductor laser array and that concurrently scans a plurality of light beams by a common scanning optical system. The main factor of this type is variations in scanning speed due to chromatic aberration in a scanning optical system because there is a difference in emission wavelength of the light sources. Because the emission wavelength varies between the light sources, the error (2) may sometimes become different in the light sources. Furthermore, the difference may occur in scanning speed of a plurality of beams depending on assembly accuracy of the light sources.

(4) Error of Each Scanning Optical System

When an image forming apparatus includes a plurality of photosensitive elements and scanning optical systems, and supports multiple colors, the difference in scanning speed of the scanning optical systems largely affects image quality. The main factor of this type includes deformation due to low manufacturing accuracy and assembly accuracy of the parts for the scanning optical systems and also due to change in the parts with time. Furthermore, because the light sources are different from each other, the error (3) may occur. This error is such that the average scanning speeds are different from each other and further the errors (1) and (2) discretely occur. Although some of image forming apparatuses include those in which part of units in the scanning optical system is shared, light paths from respective light sources to each medium to be scanned (photosensitive element) are different from each other, and hence, this error is also included in this error (4).

There have been some problems as follows about conventional control technology for pixel clock frequency. More specifically, because frequency of a reference clock used for phase comparison is frequency for a line, this frequency is extremely low (one-thousandths to one-tenths of thousandths) with respect to the pixel clock oscillated. Therefore, it is not possible to ensure a sufficient open loop gain of PLL (Phase Locked Loop) and to obtain satisfactory control accuracy. Furthermore, this frequency is weak in disturbance and the clock frequency thereby fluctuates, and therefore, a clock with high precision cannot be generated.

As a method of correcting the errors in scanning speed, various technologies are disclosed in, for example, Japanese Patent Application Laid-Open No. 2001-183600 and Japanese Patent Application Laid-Open No. 2004-262101.

DISCLOSURE OF INVENTION

Problem to be Solved by the Invention

However, in the technology disclosed in Japanese Patent Application Laid-Open No. 2001-183600, when an error is corrected for each facet, a controlled voltage of VCO, which is a voltage-controller oscillator, is changed in each scanning, and hence, there is a problem that it takes time by the time a clock frequency is stabilized and oscillated.

In the technology disclosed in Japanese Patent Application Laid-Open No. 2004-262101, the error in scanning speed is corrected by phase control of the pixel clock as necessary. Therefore, it is necessary to generate phase control data for one scanning line, and further, to reduce local deviation due to phase change of the pixel clock, that is, to generate a high precision pixel clock, it is necessary to perform high resolution phase control. Thus, phase control data is increased. Therefore, it is not easy to generate the phase control data with high speed and high accuracy. Further, when this technology is applied to a device to correct an error of each facet, it is necessary to generate phase control data for each facet, and also to generate and store vast amount of phase control data for correction thereof with high accuracy, thus, it is not easy to implement the device.

The present invention has been achieved to solve the problems, and it is an object of the present invention to provide a pixel clock generator capable of highly accurately correcting an error in scanning speed which occurs caused by various factors, a pulse modulator, and an image forming apparatus.

Means for Solving Problem

To solve the above problems and to achieve the object, a pixel clock generator according to one aspect of the present invention includes a high frequency clock generator that generates a high frequency clock; a comparator that detects a time interval between a first synchronization signal and a second synchronization signal, compares the detected time interval with a target value, and outputs an error with respect to the target value; a frequency calculator that calculates a set value of a pixel clock frequency based on the error output from the comparator, and outputs a frequency specification signal for specifying the pixel clock frequency based on the calculated set value; and a frequency divider that divides the high frequency clock by a frequency division ratio based on the frequency specification signal output from the frequency calculator, and generates the pixel clock.

A pixel clock generator according to another aspect of the present invention includes a multiphase clock generator that generates multiphase clocks in which phases are mutually shifted from each other by a phase difference T/P, where T is a cycle and P is number of the phases; a comparator that detects a time interval between a first synchronization signal and a second synchronization signal, compares the detected time interval with a target value, and outputs an error with respect to the target value; a frequency calculator that calculates a set value of a pixel clock frequency based on the error output from the comparator, and outputs a frequency specification signal for specifying the pixel clock frequency based on the calculated set value; a counting unit that sets the phase difference T/P as a unit time, and calculates a rising time and a falling time of the pixel clock by counting number of the unit times; and a pixel clock output unit that generates the pixel clock based on the rising time and the falling time of the pixel clock calculated by the counting unit, with reference to the multiphase clocks.

A pulse modulator according to still another aspect of the present invention generates a pulse modulation signal that applies a pulse modulation according to image data based on a pixel clock generated by a pixel clock generator. The pixel clock generator includes a high frequency clock generator that generates a high frequency clock; a comparator that detects a time interval between a first synchronization signal and a second synchronization signal, compares the detected time interval with a target-value, and outputs an error with respect to the target value; a frequency calculator that calculates a set value of a pixel clock frequency based on the error output from the comparator, and outputs a frequency specification signal for specifying the pixel clock frequency based on the calculated set value; and a frequency divider that divides the high frequency clock by a frequency division ratio based on the frequency specification signal output from the frequency calculator, and generates the pixel clock. The pulse modulator includes a pulse-modulation-signal generator that counts a pulse width value obtained based on the image data and the frequency specification signal with the high frequency clock, with reference to at least one of a rising and a falling of the pixel clock, and generates the pulse modulation signal of the counted pulse width value.

A pulse modulator according to still another aspect of the present invention generates a pulse modulation signal that applies a pulse modulation according to image data based on a pixel clock generated by a pixel clock generator. The pixel clock generator includes a multiphase clock generator that generates multiphase clocks in which phases are mutually shifted from each other by a phase difference T/P, where T is a cycle and P is number of the phases; a comparator that detects a time interval between a first synchronization signal and a second synchronization signal, compares the detected time interval with a target value, and outputs an error with respect to the target value; a frequency calculator that calculates a set value of a pixel clock frequency based on the error output from the comparator, and outputs a frequency specification signal for specifying the pixel clock frequency based on the calculated set value; a counting unit that sets the phase difference T/P as a unit time, and calculates a rising time and a falling time of the pixel clock by counting number of the unit times; and a pixel clock output unit that generates the pixel clock based on the rising time and the falling time of the pixel clock calculated by the counting unit, with reference to the multiphase clocks. The pulse modulator includes an image data converter that converts the image data into modulation data that indicates a predetermined pulse modulation signal, the predetermined pulse modulation signal being a bit string indicating on and off corresponding to areas obtained by time-division of the pixel clock into R pieces; a clock pattern generator that generates a clock pattern that represents each of the areas obtained by time-division of the pixel clock into the R pieces corresponding to each of areas that are divided into the phase difference T/P, based on the rising time of the pixel clock and the frequency specification signal; a modulation pattern generator that generates a modulation pattern corresponding to each of the areas that are divided into the phase difference T/P, from the modulation data converted by the image data converter and the clock pattern generated by the clock pattern generator; and a serializer that generates the pulse modulation signal by sequentially outputting the modulation pattern, based on the multiphase clocks.

An image forming apparatus according to still another aspect of the present invention forms an image by driving a light source with a pulse modulation signal that applies a pulse modulation according to image data based on a pixel clock generated by a pixel clock generator, and scanning a light flux output from the light source on a medium to be scanned. The pixel clock generator includes a high frequency clock generator that generates a high frequency clock; a comparator that detects a time interval between a first synchronization signal and a second synchronization signal; compares the detected time interval with a target value, and outputs an error with respect to the target value; a frequency calculator that calculates a set value of a pixel clock frequency based on the error output from the comparator, and outputs a frequency specification signal for specifying the pixel clock frequency based on the calculated set value; and a frequency divider that divides the high frequency clock by a frequency division ratio based on the frequency specification signal output from the frequency calculator, and generates the pixel clock.

An image forming apparatus according to still another aspect of the present invention forms an image by driving a light source with a pulse modulation signal that applies a pulse modulation according to image data based on a pixel clock generated by a pixel clock generator, and scanning a light flux output from the light source on a medium to be scanned. The pixel clock generator includes a multiphase clock generator that generates multiphase clocks in which phases are mutually shifted from each other by a phase difference T/P, where T is a cycle and P is number of the phases; a comparator that detects a time interval between a first synchronization signal and a second synchronization signal, compares the detected time interval with a target value, and outputs an error with respect to the target value; a frequency calculator that calculates a set value of a pixel clock frequency based on the error output from the comparator, and outputs a frequency specification signal for specifying the pixel clock frequency based on the calculated set value; a counting unit that sets the phase difference T/P as a unit time, and calculates a rising time and a falling time of the pixel clock by counting number of the unit times; and a pixel clock output unit that generates the pixel clock based on the rising time and the falling time of the pixel clock calculated by the counting unit, with reference to the multiphase clocks.

An image forming apparatus according to still another aspect of the present invention forms an image by driving a plurality of light sources with a pulse modulation signal that applies a pulse modulation according to image data based on a pixel clock generated by a pixel clock generator, and scanning light fluxes output from the light sources on a medium to be scanned. The pixel clock generator includes a high frequency clock generator that generates a high frequency clock; a comparator that detects a time interval between a first synchronization signal and a second synchronization signal, compares the detected time interval with a target value, and outputs an error with respect to the target value; a frequency calculator that calculates a set value of a pixel clock frequency based on the error output from the comparator, and outputs a frequency specification signal for specifying the pixel clock frequency based on the calculated set value; and a frequency divider that divides the high frequency clock by a frequency division ratio based on the frequency specification signal output from the frequency calculator, and generates the pixel clock. The image forming apparatus includes two optical detectors arranged along a scanning line of the light fluxes; and a detection signal separator that separates each of detection signals of the optical detectors into detection signals corresponding to the light sources respectively. The detection signal separator separates the first synchronization signal and the second synchronization signal input to each of the pixel clock generators into detection signals corresponding to the light sources. The light sources are driven by the pulse modulation signal generated based on each of the generated pixel clocks, in a corresponding manner.

An image forming apparatus according to still another aspect of the present invention forms an image by driving a plurality of light sources with a pulse modulation signal that applies a pulse modulation according to image data based on a pixel clock generated by a pixel clock generator, and scanning light fluxes output from the light sources on a medium to be scanned. The pixel clock generator includes a multiphase clock generator that generates multiphase clocks in which phases are mutually shifted from each other by a phase difference T/P, where T is a cycle and P is number of the phases; a comparator that detects a time interval between a first synchronization signal and a second synchronization signal, compares the detected time interval with a target value, and outputs an error with respect to the target value; a frequency calculator that calculates a set value of a pixel clock frequency based on the error output from the comparator, and outputs a frequency specification signal for specifying the pixel clock frequency based on the calculated set value; a counting unit that sets the phase difference T/P as a unit time, and calculates a rising time and a falling time of the pixel clock by counting number of the unit times; and a pixel clock output unit that generates the pixel clock based on the rising time and the falling time of the pixel clock calculated by the counting unit, with reference to the multiphase clocks. The image forming apparatus includes two optical detectors arranged along a scanning line of the light fluxes; and a detection signal separator that separates each of detection signals of the optical detectors into detection signals corresponding to the light sources respectively. The detection signal separator separates the first synchronization signal and the second synchronization signal input to each of the pixel clock generators into detection signals corresponding to the light sources. The light sources are driven by the pulse modulation signal generated based on each of the generated pixel clocks, in a corresponding manner.

An image forming apparatus according to still another aspect of the present invention includes a plurality of light sources driven by a pulse modulation according to image data based on a pixel clock generated by a pixel clock generator including a high frequency clock generator that generates a high frequency clock, a comparator that detects a time interval between a first synchronization signal and a second synchronization signal, compares the detected time interval with a target value, and outputs an error with respect to the target value, a frequency calculator that calculates a set value of a pixel clock frequency based on the error output from the comparator, and outputs a frequency specification signal for specifying the pixel clock frequency based on the calculated set value, and a frequency divider that divides the high frequency clock by a frequency division ratio based on the frequency specification signal output from the frequency calculator, and generates the pixel clock; a plurality of mediums to be scanned corresponding to the light sources, respectively, the mediums to be scanned being scanned with light fluxes from the light sources; and two optical detectors arranged along a scanning line of the light fluxes output from the light sources. A plurality of images are formed by scanning the light fluxes from the light sources on the mediums to be scanned and by superimposing the images formed on the mediums to be scanned on one image forming medium. Two detection signals respectively by the two optical detectors are used as the first synchronization signal and the second synchronization signal.

An image forming apparatus according to still another aspect of the present invention includes a plurality of light sources driven by a pulse modulation according to image data based on a pixel clock generated by a pixel clock generator including a multiphase clock generator that generates multiphase clocks in which phases are mutually shifted from each other by a phase difference T/P, where T is a cycle and P is number of the phases, a comparator that detects a time interval between a first synchronization signal and a second synchronization signal, compares the detected time interval with a target value, and outputs an error with respect to the target value, a frequency calculator that calculates a set value of a pixel clock frequency based on the error output from the comparator, and outputs a frequency specification signal for specifying the pixel clock frequency based on the calculated set value, a counting unit that sets the phase difference T/P as a unit time, and calculates a rising time and a falling time of the pixel clock by counting number of the unit times, and a pixel clock output unit that generates the pixel clock based on the rising time and the falling time of the pixel clock calculated by the counting unit, with reference to the multiphase clocks; a plurality of mediums to be scanned corresponding to the light sources, respectively, the mediums to be scanned being scanned with light fluxes from the light sources; and two optical detectors arranged along a scanning line of the light fluxes output from the light sources. A plurality of images are formed by scanning the light fluxes from the light sources on the mediums to be scanned and by superimposing the images formed on the mediums to be scanned on one image forming medium. Two detection signals respectively by the two optical detectors are used as the first synchronization signal and the second synchronization signal.

EFFECT OF THE INVENTION

According to an embodiment of the present invention, a pixel clock is generated based on a high frequency clock, and a pixel clock frequency is controlled according to a variation in scanning time. Therefore, it is possible to generate a pixel clock allowing correction of an error due to the variation with high accuracy even if average scanning speed varies.

EXPLANATIONS OF LETTERS OR NUMERALS

Figure 1:
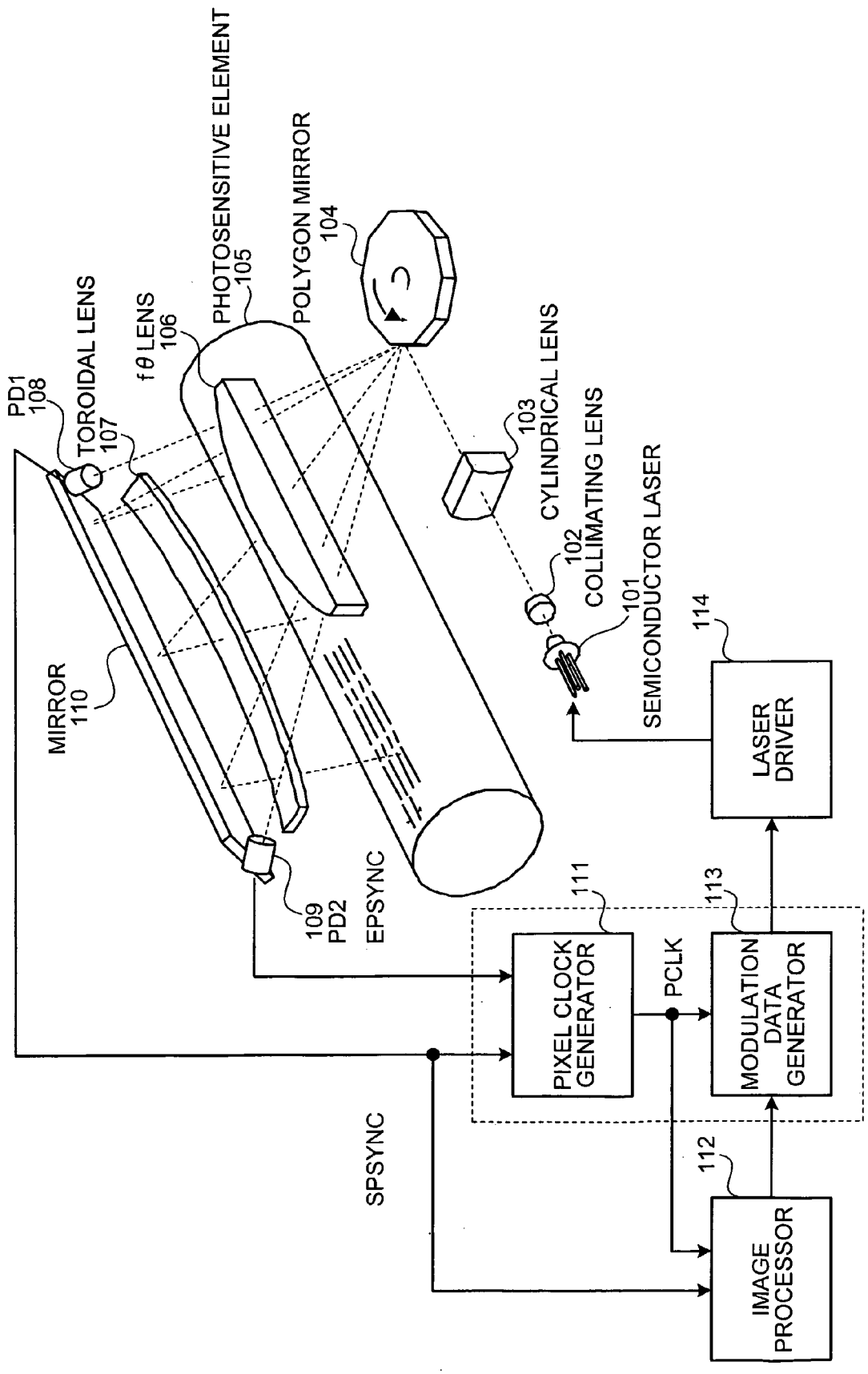
FIG. 1 is a diagram of an overall configuration of an image forming apparatus according to a first embodiment of the present invention.

1 High frequency clock generator
2 First edge detector
3 Second edge detector
4 Frequency divider
5 Comparator
6 Filter
7 Frequency calculator
51 High frequency clock generator
52 First edge detector
54 Counting unit
58 Pixel clock output unit
70 SET time calculator
71 RST time calculator
72 Counter
75 Counter
78 Delay unit
92 Modulation pattern generator
93 Serializer
101 Semiconductor laser
102 Collimating lens
103 Cylindrical lens
104 Polygon mirror
105 Photosensitive element
106 fθ lens
108, 109 Photodetector PD1, and PD2
110 Mirror
111 Pixel clock generator
112 Image processor
113 Modulation data generator
114 Laser driver
118 Pixel clock generator
119 Modulation data generator
126 Synchronization signal separator
127 Pixel clock generator
128 Modulation data generator
130 Pixel clock generator
131 Modulation data generator
133 Image processor
153, 155, 156 Return mirror

BEST MODE(S) FOR CARRYING OUT THE INVENTION

Exemplary embodiments of a pixel clock generator, a pulse modulator, and an image forming apparatus according to the present invention are explained in detail below with reference to attached drawings. It is noted that the present invention is not limited by these embodiments.

FIG. 1 is a diagram of an overall configuration of an image forming apparatus according to a first embodiment of the present invention. The image forming apparatus includes a semiconductor laser 101, a collimating lens 102, a cylindrical lens 103, a polygon mirror 104, a photosensitive element 105, a fθ lens 106, a toroidal lens 107, photodetectors PD1 (108) and PD2 (109), a mirror 110, a pixel clock generator 111, an image processor 112, a modulation data generator 113, and a laser driver 114.

A laser beam emitted from the semiconductor laser 101 as a light source is shaped by being passed through the collimating lens 102 and the cylindrical lens 103 to enter the polygon mirror 104 as a polarizer, and is thereby reflected so as to scan the photosensitive element 105 while maintaining a periodicity. The laser beam reflected is radiated to the photosensitive element 105 through the fθ lens 106, the mirror 110, and the toroidal lens 107, to form a beam spot. An electrostatic latent image is thereby formed on the photosensitive element 105 according to an output of the semiconductor laser 101.

The photodetector PD1 (108) and the photodetector PD2 (109) are provided on both ends of the mirror 110, so that the start and the end of scanning are detected. More specifically, the laser beam reflected by the polygon mirror 104 enters the photodetector PD1 (108) before one-line scanning is performed on the photosensitive element 105, and enters the photodetector PD2 (109) after the scanning. The photodetectors convert the laser beams entered, to a first synchronization signal SPSYNC and a second synchronization signal EPSYNC, respectively, and supply them to the pixel clock generator 111.

The pixel clock generator 111 measures a time interval in which the laser beam scans between the photodetectors PD1 (108) and PD2 (109), from the two synchronization signals SPSYNC and EPSYNC, generates a pixel clock PCLK of frequency obtained so that a fixed number of clocks preset falls within the time interval, and supplies the pixel clock to the image processor 112 and the modulation data generator 113. The configuration of the pixel clock generator 111 is explained later.

The first synchronization signal SPSYNC which is an output signal of the photodetector PD1 (108) is also provided to the image processor 112 as a line synchronization signal. The image processor 112 generates image data based on the pixel clock PCLK.

The modulation data generator 113 generates modulation data from the image data input, based on the pixel clock PCLK, and drives the semiconductor laser 101 through the laser driver 114.

Figure 2:
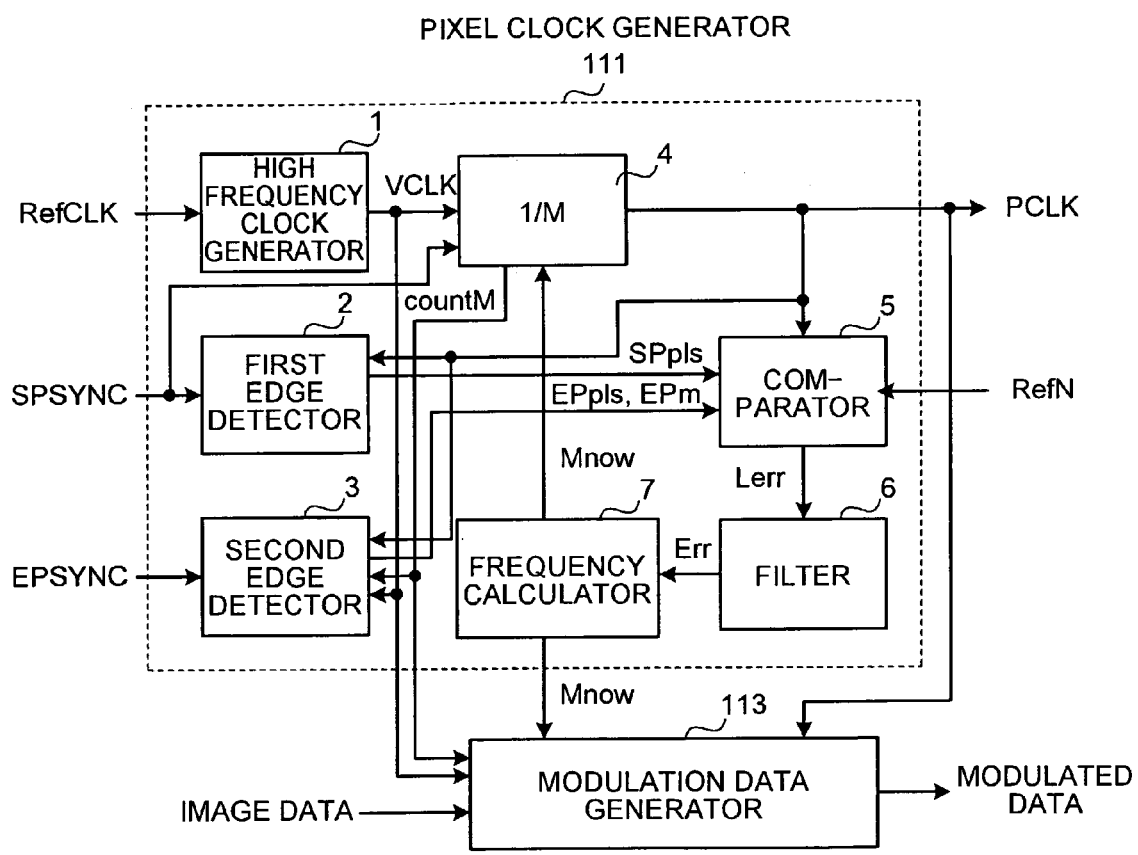
FIG. 2 is a functional block diagram of a pixel clock generator 111.

FIG. 2 is a functional block diagram of the pixel clock generator 111. The pixel clock generator 111 includes a high frequency clock generator 1, a first edge detector 2, a second edge detector 3, a frequency divider 4, the comparator 5, a filter 6, and the frequency calculator 7.

In the pixel clock generator 111 shown in FIG. 2, the high frequency clock generator 1 generates a high frequency clock VCLK multiplied based on a reference clock RefCLK, and is formed with an ordinary PLL (Phase Locked Loop) circuit. An output of, for example, a high precision crystal oscillator is used for the reference clock RefCLK to be input, a high accuracy, high frequency clock VCLK is thereby obtained. The pixel clock generator 111 generates a pixel clock PCLK based on the high frequency clock VCLK.

The frequency divider 4 generates a pixel clock PCLK obtained by dividing the high frequency clock VCLK by M. The frequency divider 4 is formed with, for example, an Mary counter, and outputs a count value "countM". Here, if counting is started on rising edge of the synchronization signal SPSYNC, a pixel clock whose phase synchronizes scanning start time can be generated. A frequency division ratio M is changed according to a pixel-clock-frequency specification signal Mnow sent from the frequency calculator 7. The pixel clock PCLK is generated through division of the high frequency clock VCLK, which is stably and highly precisely oscillated, in the above manner. Therefore, by changing the frequency division ratio, the pixel clock frequency can be changed instantly and stably. Thus, even if the frequency is changed for each line, the pixel clock frequency can instantly response to the change.

The first edge detector 2 detects the rising edge of the first synchronization signal SPSYNC based on the high frequency clock VCLK, and outputs a detection pulse SPpls in synchronization with the pixel clock PCLK when detecting the rising edge of the synchronization signal SPSYNC.

The second edge detector 3 detects rising edge of the second synchronization signal EPSYNC based on the high frequency clock VCLK, and outputs a detection pulse EPpls and a count value EPm.

The comparator 5 detects a time Tline between the two synchronization signals SPSYNC and EPSYNC, and calculates a difference between a reference time and the time Tline counted as an error Lerr of the line, the reference time being preset according to a write frequency and a distance between the two photodetectors PD1 and PD2. In other words, a difference between an appropriate scanning time (reference time) and the scanning time Tline for the line is an error in scanning speed.

The error Lerr may be calculated by counting based on the high frequency clock VCLK, but the high frequency clock VCLK is extremely high frequency and the number of bits to be counted becomes enormous, and hence, the calculation is disadvantageous in terms of a circuit scale and power consumption. In the first embodiment, therefore, the time Tline is counted based on the pixel clock PCLK, the time counted is compared with a reference value RefN, and is finally converted as a line error Lerr based on the high frequency clock.

The filter 6 is a digital filter that subjects the line error Lerr to filtering and outputs error data Err. In short, the error data Err is obtained by averaging errors Lerr for a plurality of nearest lines.

The frequency calculator 7 calculates an appropriate pixel clock frequency according to the error data Err, converts the frequency calculated to the pixel-clock-frequency specification signal Mnow, and outputs the specification signal Mnow. When a pixel clock frequency is set as Tp=KTv and scanned, where Tv is a high frequency clock cycle and Tp is a pixel clock cycle, an error Err between the set value and a target value Tp' (Tp'=K'Tv) is input. Therefore, since RefN·Tp'=RefN·Tp+Err·Tv, and if K' is set by Equation (1), the pixel clock frequency can be controlled to the target value.

$$K'=K+\text{Err}/\text{RefN} \qquad (1)$$

In other words, digital PLL (DPLL) control is performed by the frequency divider 4, the comparator 5, the filter 6, and the frequency calculator 7. PLL control property is decided by the characteristic of the filter 6, and the filter characteristic is decided so that a control system is stabilized. Alternatively, a loop gain may be changed by setting the equation to K'=K+α·Err/RefN.

Because the frequency division ratio M of the frequency divider 4 is a natural number, if a set value K of the pixel clock frequency is converted to the pixel-clock-frequency specification signal Mnow in the following manner, a rounding error can be reduced, thus, obtaining a higher-precision pixel clock. Generally, for example, the set value K is rounded to the nearest whole number, this number is set to M, and Mnow=M, and by setting Mnow=M+1 or M−1 once in C cycles of the pixel clock, K=(M±1/C) is obtained, so that the rounding error can be reduced. Furthermore, the rounding error is evenly allocated, and it is thereby possible to minimize local deviation of the pixel clock. In this case, the M value and the C value should be controlled. Detailed explanation will be given later.

Figure 3:
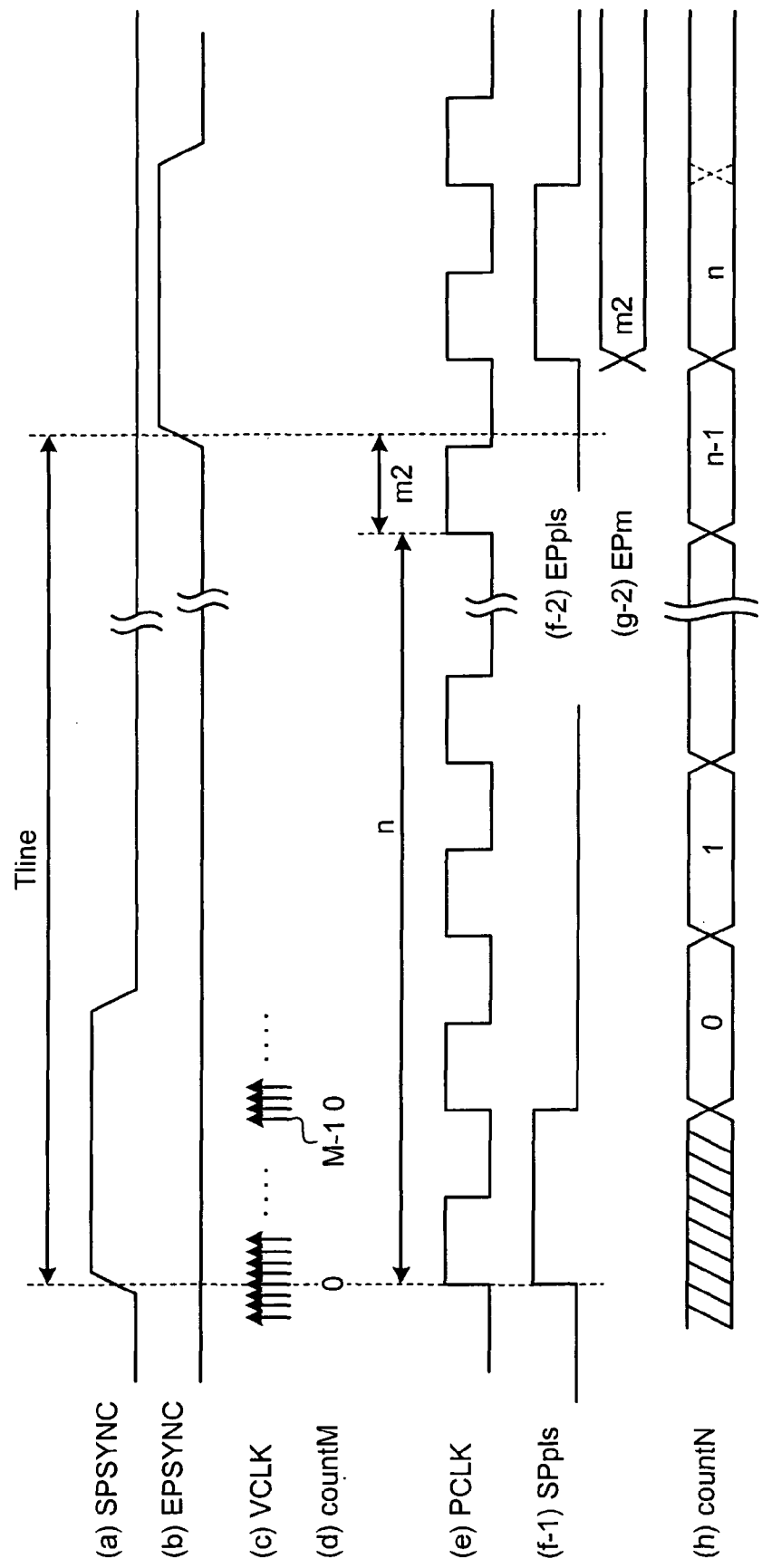
FIG. 3 is a timing chart of one example of signals in the pixel clock generator 111.
Figure 4:
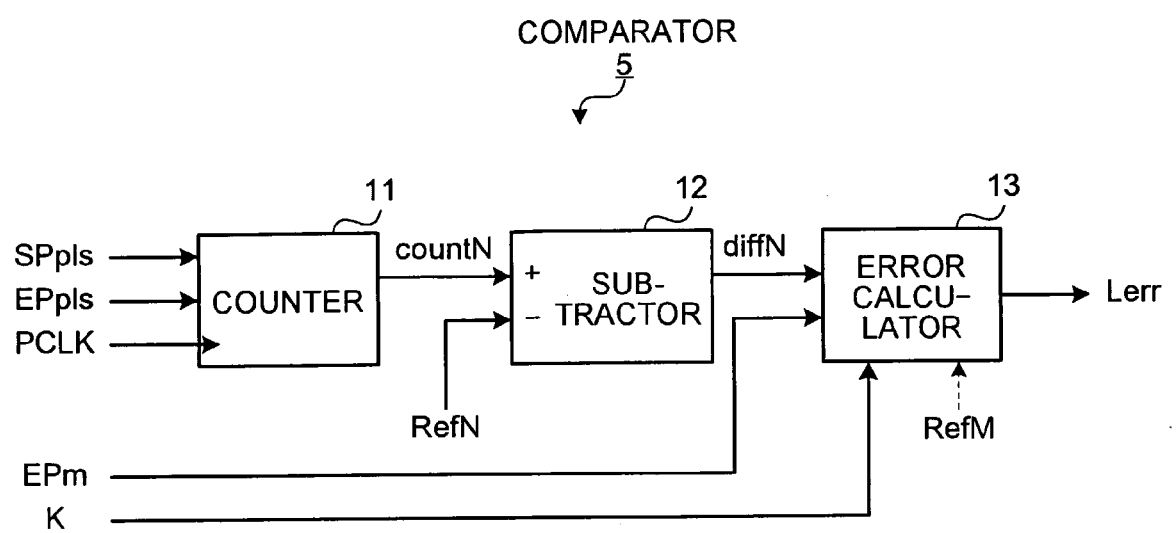
FIG. 4 is a functional block diagram of a comparator 5.

FIG. 3 is a timing chart of one example of signals in the pixel clock generator. FIG. 4 is a functional block diagram of the comparator 5. The operation of the comparator 5 is explained in detail below with reference to FIG. 3 and FIG. 4.

In FIG. 3, (a) SPSYNC represents the first synchronization signal that indicates start of scanning, and is input to the first edge detector 2, (b) EPSYNC represents the second synchronization signal that indicates end of scanning, and are input to the second edge detector 3, and (c) VCLK represents rising edge of a high frequency clock generated in the high frequency clock generator 1. (d) countM represents a count value counted by the frequency divider 4 based on the high frequency clock VCLK, (e) PCLK represents a pixel clock that rises when (d) countM is 0. (f-1) SPpls and (f-2) EPpls represent pulses synchronizing PCLK that indicates the rising edges of (a) SPSYNC and (b) EPSYNC respectively. (g-2) EPm represents a value of (d) countM upon rising of (b) EPSYNC, and (h) represents a count value counted based on the pixel clock PCLK in the comparator 5, and the count value is reset to 0 with the (f-1) SPpls and the count is stopped with the (f-2) EPpls.

In the comparator 5 of FIG. 4, a counter 11 counts based on the pixel clock PCLK, and resets counts to 0 with the SPpls and stops counting with the EPpls. A subtractor 12 subtracts the reference count value RefN from the value countM (n in FIG. 3) of the counter 11 after the counting is stopped, and outputs a subtraction result diffN. An error calculator 13 calculates in the following manner and outputs an error Lerr using the cycle Tv of the high frequency clocks VCLK as a unit.

$$Lerr=diffN \cdot K+EPm$$

where diffN=n−RefN, EPm=m2, Tp=K·Tv, and Tp is a cycle of PCLK.

When a distance between the two photodetectors PD1 and PD2 is not an integral multiple of a dot width, that is, when the reference time is not an integral multiple of a target pixel clock cycle, a fraction thereof is converted to the number of cycles of the high frequency clock VCLK, and this value converted, as RefM, is input to the error calculator 13, and then calculation is performed by the following equation $$Lerr=diffN \cdot K+EPm-RefM$$

thus, more accurately controlling a pixel clock frequency.

Figure 5:
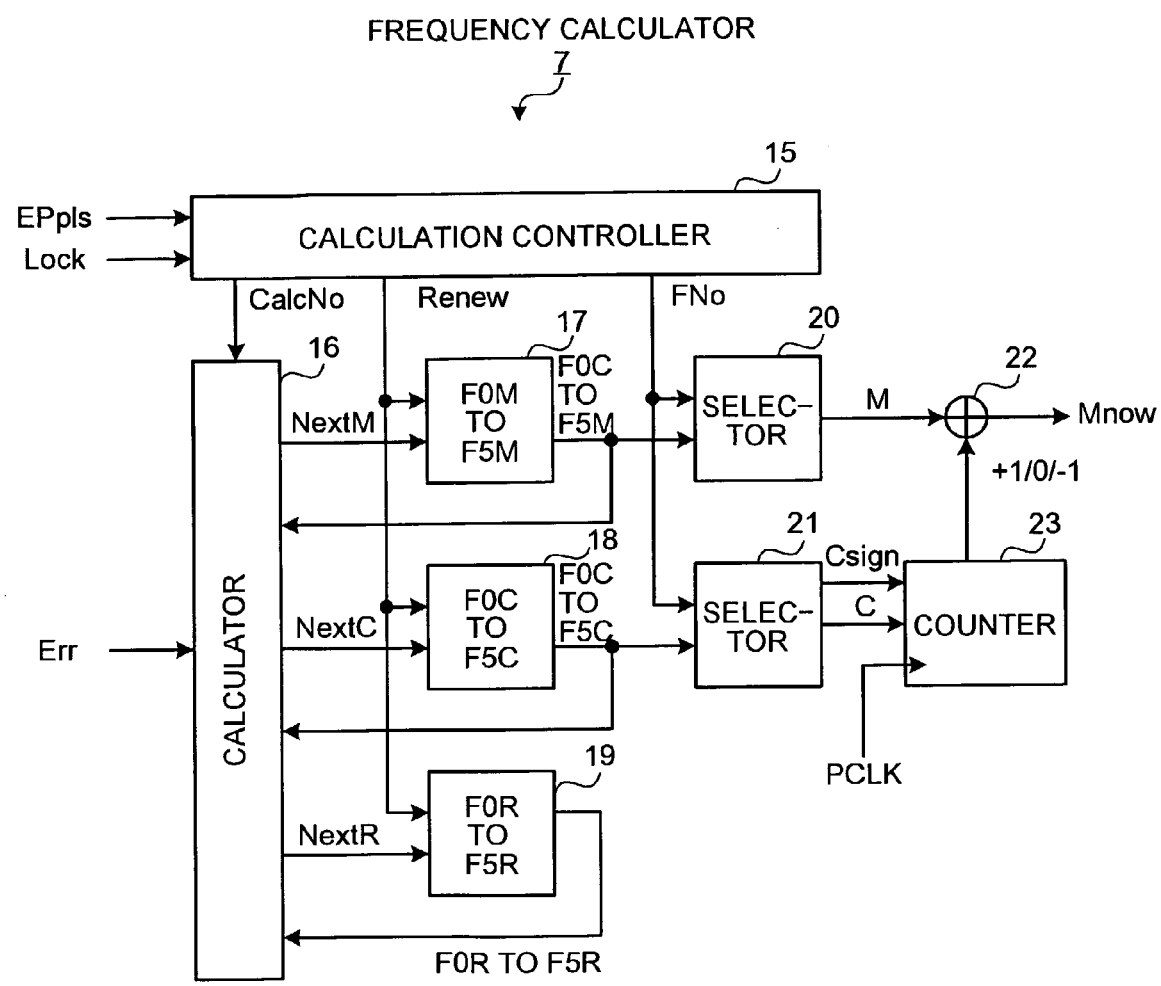
FIG. 5 is a functional block diagram of a frequency calculator 7.

FIG. 5 is a functional block diagram of the frequency calculator 7. In the first embodiment, the polygon mirror has six facets, and a pixel clock frequency is controlled for each facet to correct an error of each facet.

A calculator 16 of the frequency calculator 7 calculates next set values NextM, NextC, and NextR from current set values M, C, and R and from an error data Err, and this calculation is performed for each facet according to a calculation facet specification signal CalcNo. The relation among M, C, and R is Tp=(M±1/C)Tv, and C=RefN/R. Based on these equations and the equation (1), by abbreviating in such a manner as NextM=M', NextR=R', and RefN=Nr, the following equation is obtained $$M'+R'/Nr=M+R/Nr+Err/Nr,\ C'=Nr/R'$$

and calculation is performed in the following procedure.
(1) Calculate R+Err (=TmpR).
(2) If TmpR>Nr/2, it is set to R'=TmpR−Nr assuming M'=M+1. If TmpR<−Nr/2, it is set to R'=TmpR+Nr assuming M'=M−1. Otherwise, M'=M, and R'=TmpR.
(3) Quotient of Nr/R' is set to C'. If R'=0, it is set to C'=0.

A register 17 is a data holder that holds M values obtained through the calculation, and values held include values of F0M to F5M for each facet of the polygon mirror. A register value corresponding to a renew signal Renew is renewed to NextM. Here, a mark * indicates any one of facet numbers 0 to 5, and F* indicates a value corresponding to a facet number of the polygon mirror (hereinafter the same). It is noted that the facet numbers indicate a relative relation and a corresponding value is automatically controlled, and hence, there is no need that the facet number be made to coincide with an actual facet.

Likewise, a register 18 is a data holder that holds C values currently set, and a register 19 is a data holder that holds R values (F0R to F5R) currently set. Corresponding register values are renewed to NextC and NextR, according to the renew signal Renew, respectively.

A selector 20 selects a corresponding M value out of F0M to F5M according to a facet selection signal FNo and outputs the M value. Likewise, a selector 21 selects a corresponding C value out of F0C to F5C according to the facet selection signal FNo and outputs the C value. It is noted that Csign indicates a sign of the C value.

A counter 23 counts a C value based on the PCLK. The C value counted ranges from 0 to C−1. When the count value reaches C−1, the counter 23 outputs +1 if the Csign indicates positive, outputs −1 if the Csign indicates negative, and outputs 0 if anything else. When C=0, 0 is always output.

An adder 22 adds M output from the selector 20 and a value output from the counter 23, and outputs the result of addition as a pixel-clock-frequency specification signal Mnow. Therefore, the M value is converted once in C cycles of PCLK so as to be +1 or −1, and an average cycle of the pixel clock becomes (M±1/C)Tv.

The calculation controller 15 controls the calculation, generates the calculation facet specification signal CalcNo, the renew signal Renew, and the facet selection signal FNo, and outputs the signals. The output of these signals is explained with reference to the following flowchart.

Figure 6:
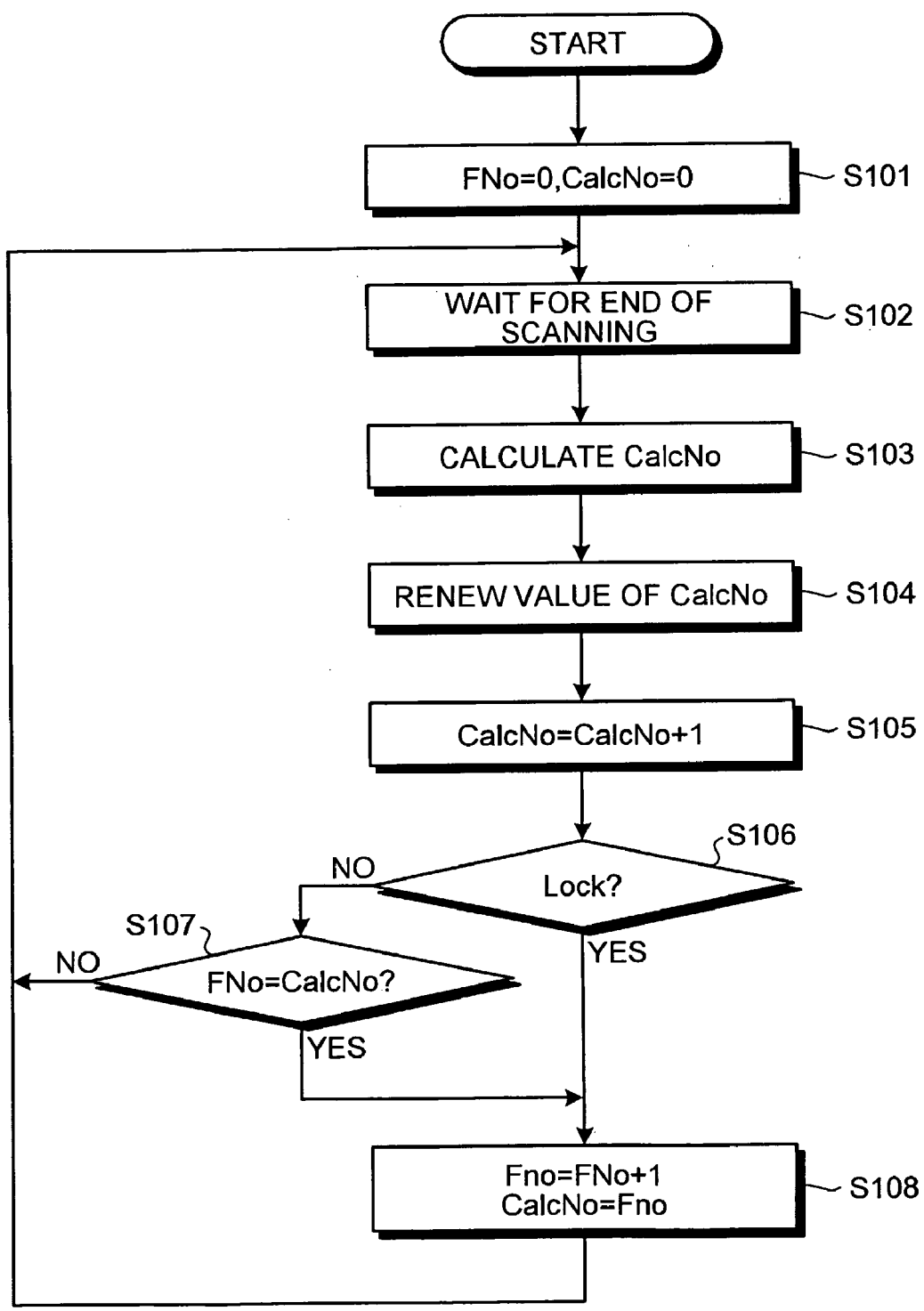
FIG. 6 is a flowchart for explaining a procedure of how a calculation controller 15 outputs a signal.

FIG. 6 is a flowchart for explaining a procedure of how a calculation controller outputs a signal. At first, the calculation controller 15 initializes based on FNo=0 and CalcNo=0 (step S101). The calculation controller 15 waits until one line scanning is finished, that is, until the end of scanning is detected through EPpls. The waiting time includes an extra time until calculation of error data Err is determined (step S102).

The calculation controller 15 performs the calculation corresponding to the current CalcNo (step S103). The calculation controller 15 then makes active the renew signal Renew corresponding to the current CalcNo, and renews a value of each register to a next value (step S104). The CalcNo is incremented. When CalcNo=5, the value returns to 0 (step S105). The process branches according to a lock flag Lock indicating whether control for pixel clock frequency is locked (step S106). The lock flag Lock mentioned here indicates a signal indicating that the control is locked in the following case. The case is such that an error Lerr (or error data Err)

among predetermined lines (e.g., six lines) falls within a fixed range (which is decided from a variation range of a between-facet error or from desired control accuracy, and, it is set to, for example, within ±2M). A generator of this signal is only necessary to be provided, for example, in the filter 6. Alternatively, a fixed time (specified by the number of lines, etc.) from the start of control is previously set according to control responsivity. And when the time elapses, the Lock signal may be made active.

When a determination result is No, that is, when the control is not yet locked (step S106, No), it is determined whether calculation has been performed for all the facets and set values has been renewed (step S107). If the calculation has been performed for all the six facets (step S107, Yes), FNo=CalcNo is obtained, and the process proceeds to step S108. If it is negative (step S107, No), the process returns to step S102, where the calculation is performed for another facet.

At step S108, FNo is incremented (if 5, the value is returned to 0), and FNo is substituted in the CalcNo. In other words, the value after the increment is substituted therein. This causes the M value and the C value, which are converted to the pixel-clock-frequency specification signal Mnow, to be changed to values set for the next line (step S108). The operations so far are performed by the time the scanning of the next line (detection of SPSYNC) is started. Then, the process returns to step S102, where the routine is repeated.

The calculation controller 15 controls in the above manner and continues controlling so as to reduce an error Err for all the facets until each clock frequency of the facets falls within a predetermined error. Therefore, high speed pull-in is possible, and after the clock frequencies fall within the predetermined error, control is provided discretely for each facet, which allows reduction in the between-facet error and also high accuracy control over clock frequency.

Figure 7:
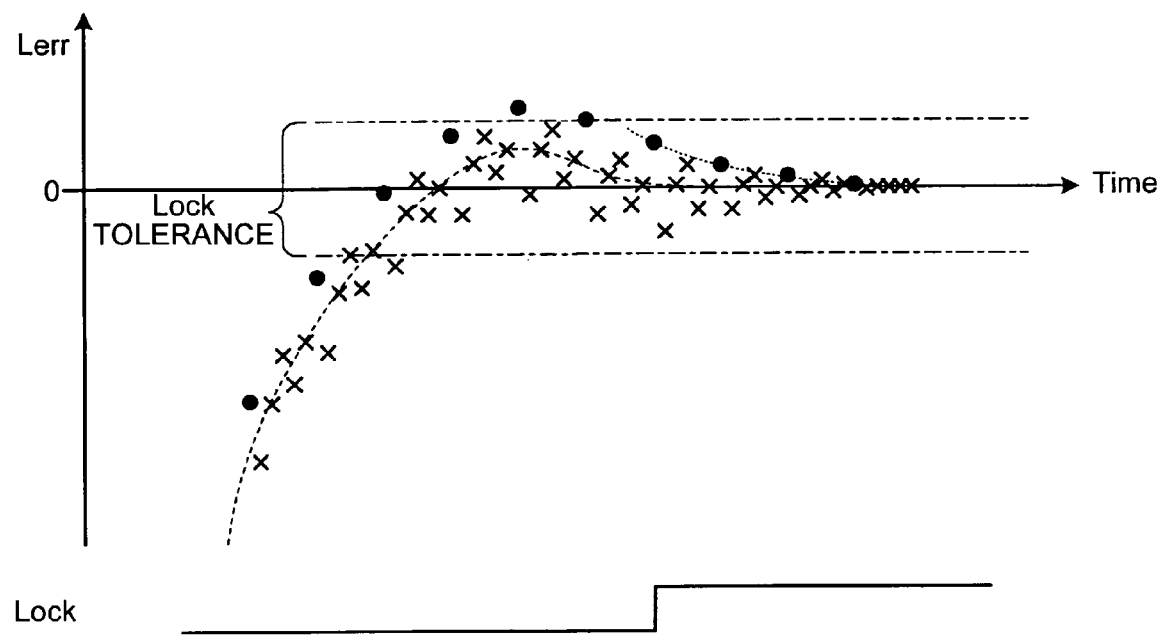
FIG. 7 is a diagram for explaining one example of a pull-in process by a control method according to the first embodiment.

FIG. 7 is a diagram for explaining one example of a pull-in process by a control method according to the first embodiment. In FIG. 7, the x-axis indicates time, and the y-axis indicates a line error Lerr. Black circles are errors corresponding to a 0-th facet. Errors of the other facets are indicated by a mark of cross. A dotted line indicates an average of errors for the six facets.

Figure 8:
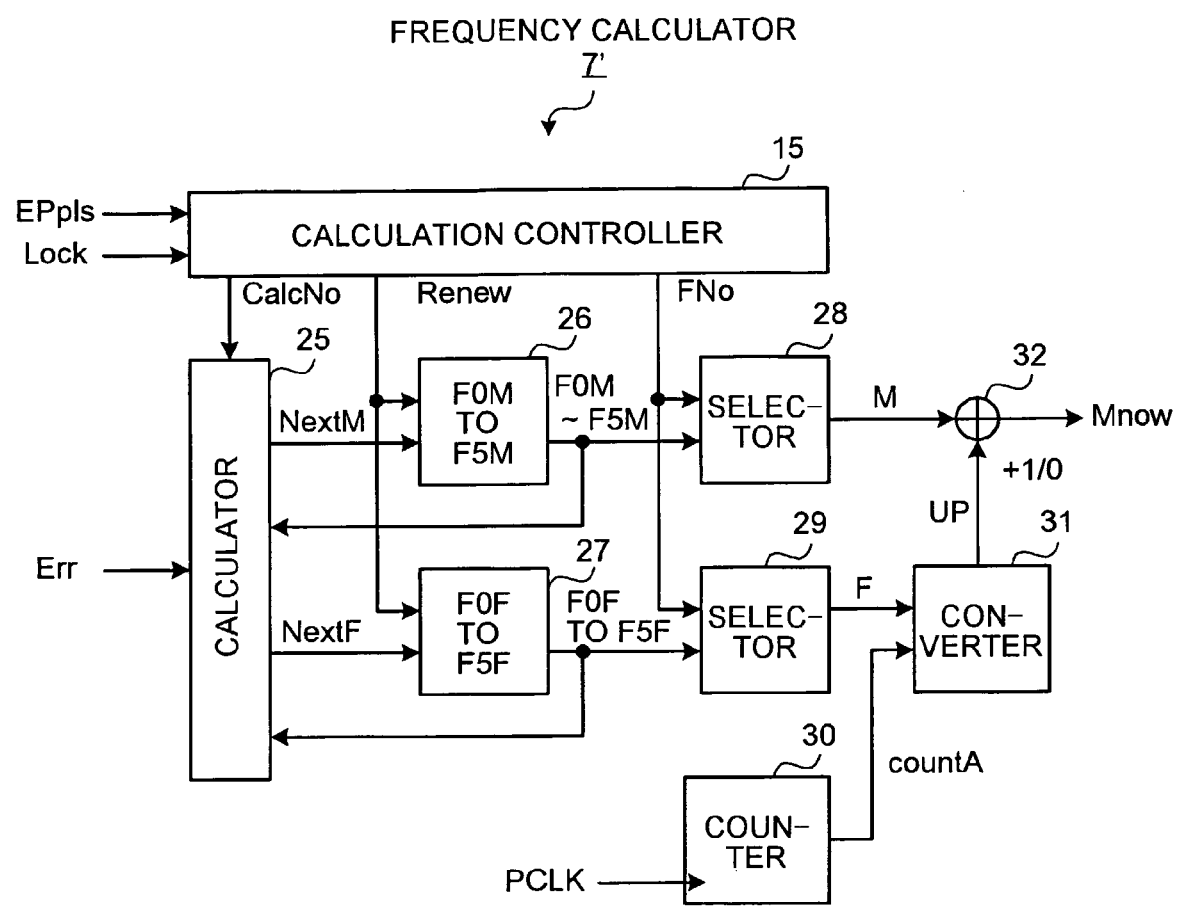
FIG. 8 is a functional block diagram of a frequency calculator according to a modification of the first embodiment.

FIG. 8 is a functional block diagram of a frequency calculator according to a modification of the first embodiment. The calculation controller 15 in a frequency calculator 7' according to the modification performs control for calculation required herein in the same manner as that of the calculation controller 15 of FIG. 5. A calculator 25 calculates next set values NextM and NextF from the current set values M, F and from the error data Err, and performs these calculations for each facet according to the calculation facet specification signal CalcNo.

In the frequency calculator according to the modification, the set value K of a pixel clock frequency is converted to a pixel-clock-frequency specification signal Mnow in the following manner. More specifically, an integer part of the set value K is M, and a decimal part is rounded to a value F of "a" digits (in binary notation). Then, when by setting Mnow=M+1 "F" times in $2^a$(=Na) cycles, K=(M+F/Na) is set. A rounding error due to the set value becomes Nref/Na at maximum, and the number of digits "a" of the decimal part is decided so as to fall within desired error tolerance. To suppress a local frequency deviation, F times in cycles in which 1 is added are evenly allocated. A converter 31 bears this function (detailed operation is explained later). Consequently, by abbreviating in such a manner as NextF=F' according to the equation (1) and the relation equation of K, the following equation is obtained $$K'+F'/Na=M+F/Na+Err/Nr$$

and therefore, calculation is performed in the following procedure.

(1) Calculate F+Err/Nr*Na (=TmpF). Because Na is $2^a$, *Na only takes high order "a" bits of a multiplicand (Err/Nr), and because Nr is fixed during this frequency control, an inverse number of Nr is previously calculated, and by multiplying Err by this number, calculation is easily performed.

(2) If TmpF>Na, it is set to M'=M+1, and F'=TmpF−Na. If TmpF<0, it is set to M'=M−1, and F'=TmpF+Na.

As the case of FIG. 5, a register 26 is a data holder that holds M values obtained through the calculation, and a register 27 is also a data holder that holds F values obtained through the calculation. These values are held corresponding to F0 to F5 for each facet of the polygon mirror. Corresponding register values are renewed to NextM and NextF according to the renew signal Renew, respectively.

A selector 28 selects a corresponding M value out of F0M to F5M according to the facet selection signal FNo, and outputs the M value. Likewise, a selector 29 selects a corresponding F value out of F0F to F5F according to the facet selection signal FNo, and outputs the F value.

A counter 30 is an a-bit counter that counts based on PCLK, and outputs a count value countA. The converter 31 outputs a signal UP by setting "1" for F cycles and "0" for remaining Na-F cycles during Na(=$2^a$a) cycles according to the count value countA. Generation of the UP signal is implemented in such a manner that when a count value countA [0:a-1] obtained by inverting a bit arrangement of a count value countA [a-1:0] is set as Arev, and by setting 1 if Arev is smaller than F (UP=(Arev<F)), "1" is generated F times evenly during the Na cycles.

An adder 32 adds M output from the selector 28 and UP output from the converter 31, and outputs the result of addition as a pixel-clock-frequency specification signal Mnow. Therefore, conversion is performed so that the M value is incremented by 1 F times in the Na cycles of the PCLK, and an average cycle of the pixel clock becomes (M+F/Na)Tv.

As explained above, the pixel clock frequency is controlled in such a manner that a phase error Lerr is detected for each line, and digital PLL control is provided so that the phase error becomes 0. The filter 6 is a digital filter provided in a control loop, and by changing the filter characteristic, a control range can be set. A setting example of the filter is explained below.

Figure 9:
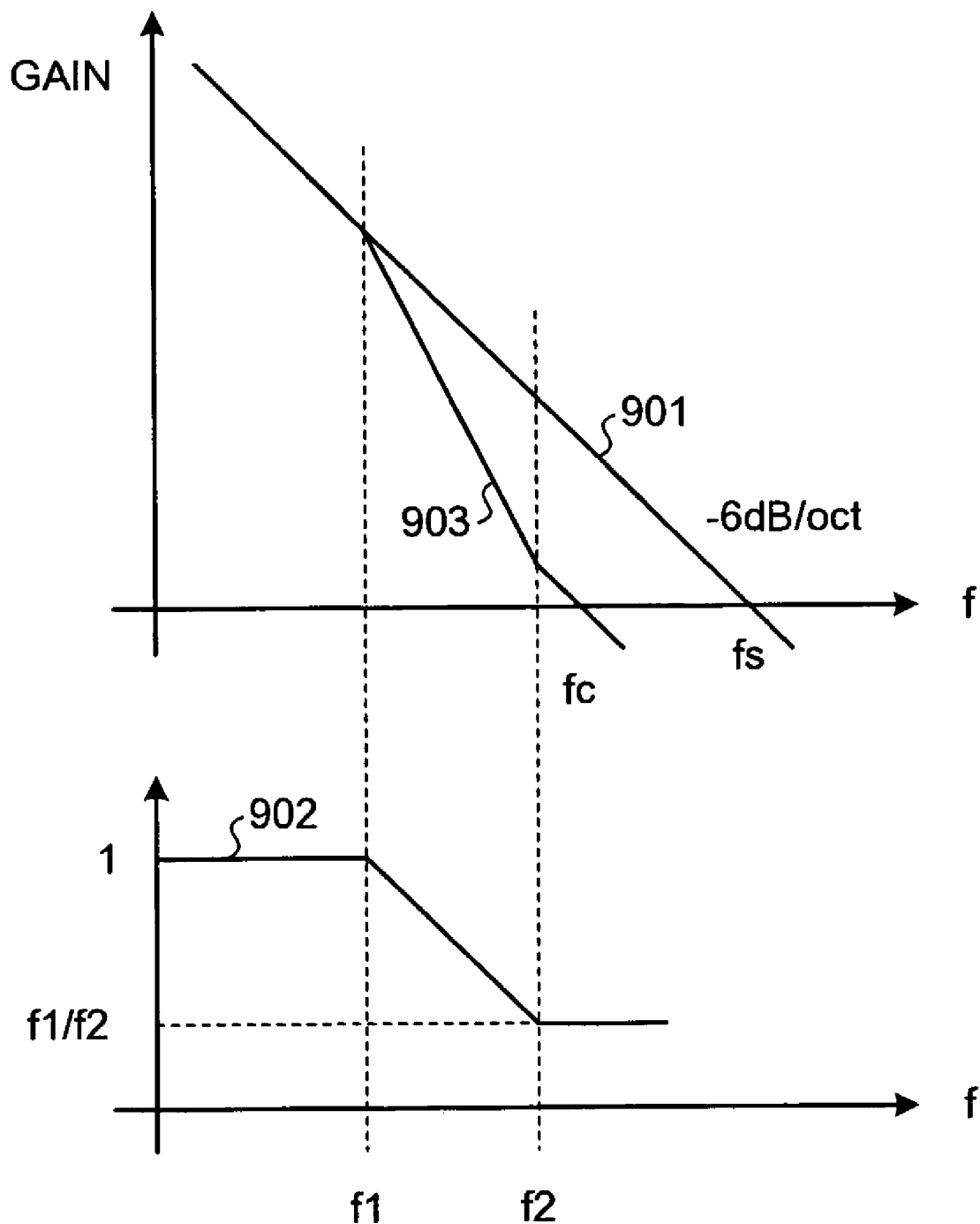
FIG. 9 is a diagram for explaining one example of a filter characteristic.

FIG. 9 is a diagram for explaining one example of filter characteristic. At first, a loop gain of a DPLL control system excluding a loop filer becomes like a line 901, where fs is a sampling frequency i.e. a line frequency, herein. A lag/lead filter having the characteristic like a broken line 902 is inserted into the control system to obtain a loop gain 903, thus, stabilizing the control system.

A transfer function H(s) of the loop filter becomes the following equation $$H(s)=(1+\tau 2s)/(1+\tau 1s)$$

where $\tau 1=1/2\pi f1$ and $\tau 2=1/2\pi f2$.

The equation is subjected to bilinear transformation (s=2/T·(1−$z^{-1}$)/(1+$z^{-1}$)) to be converted to z-transform format, and by normalizing it when T=1, the transfer function H(z) becomes the following equation.

$$H(z)=(b0+b1z^{-1})/(1+a1z^{-1})$$

where $a1=(1-2\tau1)/(1+2\tau1)$, $b0=(1+2\tau2)/(1+2\tau1)$, and $b1=(1-2\tau2)/(1+2\tau1)$.

Figure 10:
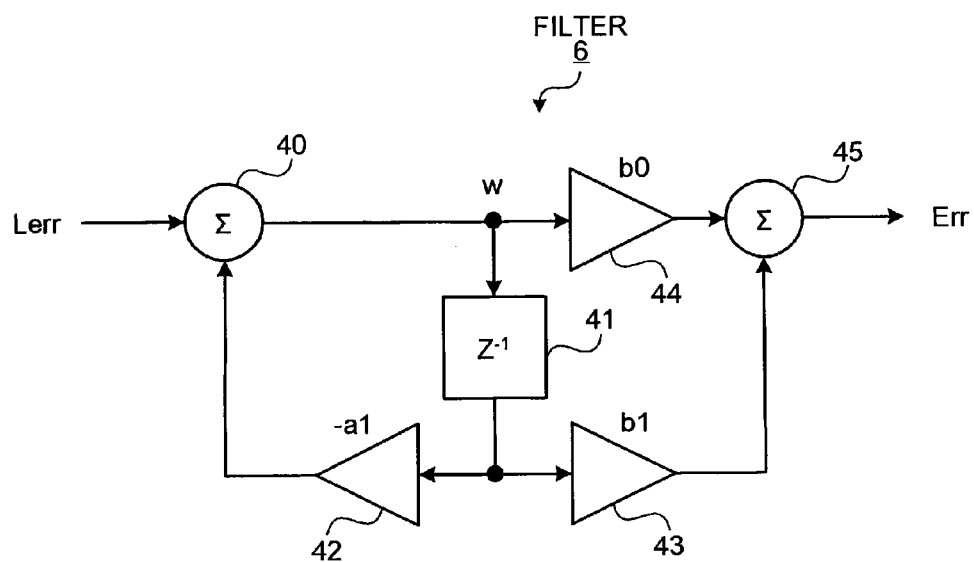
FIG. 10 is a functional block diagram of a filter for implementing a transfer factor H(z)

FIG. 10 is a functional block diagram of a filter for implementing the transfer factor H(z). The filter 6 is a primary IIR type filter. Adders 40 and 45 add each input, and multipliers 42, 43, and 45 multiply each input by factors −a1, b1, and b0 to obtain values, respectively, and output the values. A delay element 41 delays an intermediate variable w for each one sample, i.e. for each one line. By inputting the line error Lerr to the filter 6, the error data Err is obtained.

Furthermore, by providing units for changing the factors of the multipliers 42, 43, and 44, respectively, the filter characteristic can be changed dynamically. For example, the filter characteristic may be changed according to the Lock signal.

The filter characteristic and the configuration according to the first embodiment are one examples, and therefore, the present invention is applicable to filters having other configurations. Because the digital filter is the known technology, examples of the other configurations are omitted.

An appropriate modulation method in the modulation data generator 113 is explained below. The modulation data generator 113 modulates a pulse width according to image data based on the pixel clock PCLK generated in the pixel clock generator 111 (FIG. 2).

Figure 11:
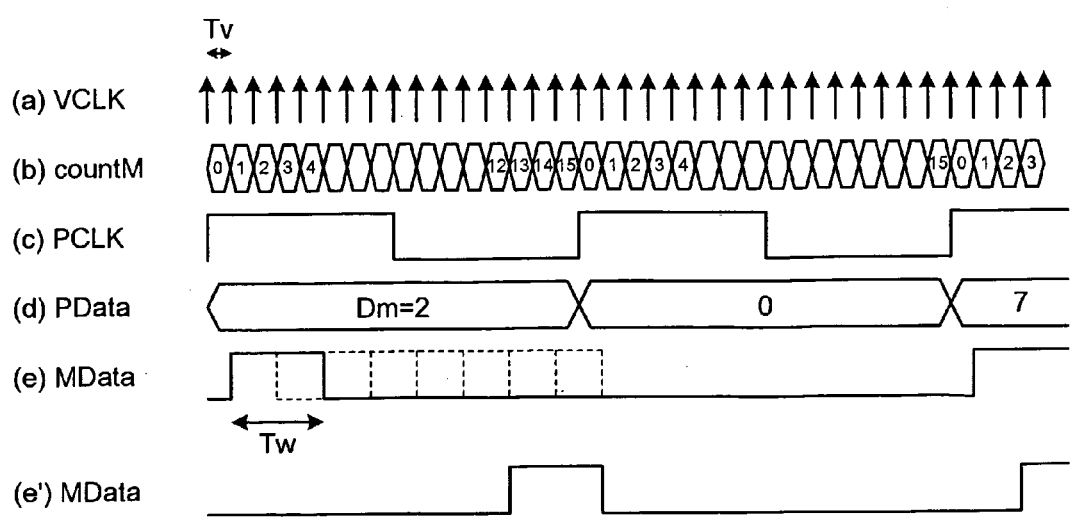
FIG. 11 is a diagram for explaining timing operation in a modulation data generator 113.

FIG. 11 is a diagram for explaining timing operation in the modulation data generator 113. In this case, modulation data MData having being subjected to 8-value pulse width modulation according to image data PData is generated. In FIG. 11, (a) VCLK indicates the rising edge of a high frequency clock (cycle Tv), and (b) countM is a count value counted by the frequency divider 4, and here, Mnow=16 is set. In FIG. 11 also, (c) PCLK is a pixel clock, and here, its cycle is 16 Tvs, and (d) PData is image data input in synchronization with PCLK, and a pulse width Tw of (e) MData to be output is modulated according to a value Dm of the image data.

The modulation data MData is generated based on the high frequency clock VCLK, and if Dm≠0, the signal is set to high level "H" when countM=0. Furthermore, the signal is set to low level "L" when countM=Dm/Nm·Mnow (Nm is number of tones, which is 8 here). It is set to "H" when countM=(Nm−Dm)/Nm·Mnow, and if Dm≠8, it is set to "L" when countM=0, and modulation data like (e') can thereby be generated. Furthermore, these two generation modes may be switched so as to change between them for each dot.

How to control the pixel clock frequency according to a variation in scanning time between two points such as the start of scanning and the end thereof is explained, but if the scanning speed in one line is almost constant, control may be provided according to a variation in the scanning time between arbitrary two points in one line, and this can be used in the first embodiment.

As explained above, in the pixel clock generator according to the first embodiment, a pixel clock is generated based on the high frequency clock VCLK highly precisely generated, and the pixel clock frequency is controlled according to the variation in the scanning time. Therefore, even if an average scanning speed varies, it is possible to generate a pixel clock allowing error correction with high accuracy. Furthermore, the pixel clock frequency is controlled corresponding to each facet of the polygon mirror, and hence, even if there is an error in scanning speed for each facet, it is possible to generate a pixel clock allowing error correction with high accuracy. Moreover, by applying the pixel clock generator to the image forming apparatus, an image is formed based on the pixel clock in which the error in the scanning speed is highly accurately corrected, thus, obtaining a high quality image.

An image forming apparatus according to a second embodiment of the present invention has a different point from the first embodiment in that a high frequency clock is formed with multiphase clocks in which phases shift by a fixed phase difference and the multiphase clocks are used to form a pixel clock.

Figure 12:
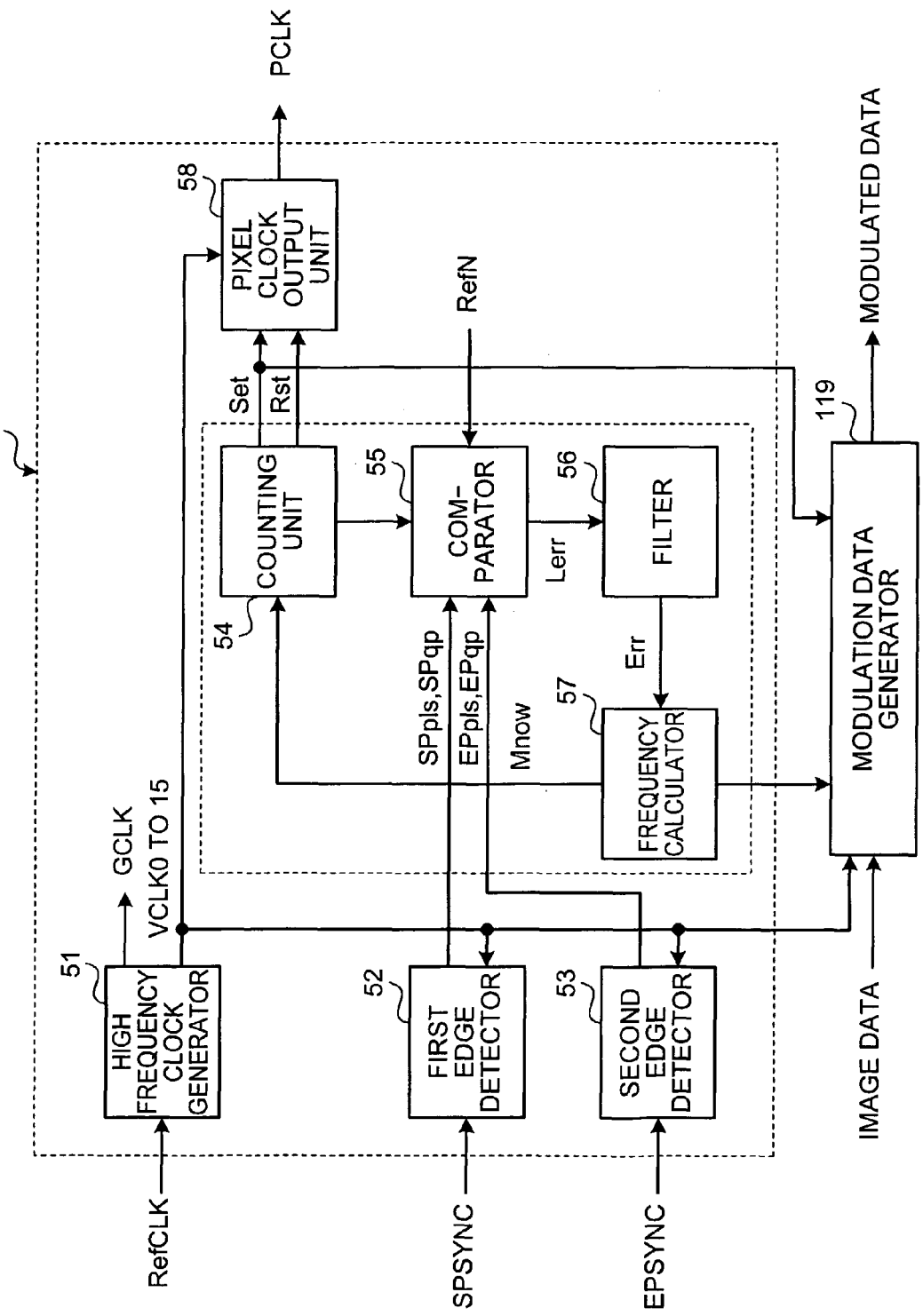
FIG. 12 is a functional block diagram of a pixel clock generator according to a second embodiment of the present invention.

FIG. 12 is a functional block diagram of a pixel clock generator according to the second embodiment. In a pixel clock generator 118 of FIG. 12, a high frequency clock generator 51 performs multiplication based on the reference clock RefCLK, to generate multiphase clocks in which phase difference is equally spaced. The second embodiment is configured to generate 16-phase multiphase clocks VCLK0 to 15. One of the multiphase clocks is divided by Q (Here, Q=4) to generate a clock GCLK for internal operation, and the clock is supplied to components (not shown) of the pixel clock generator 118.

Figure 13:
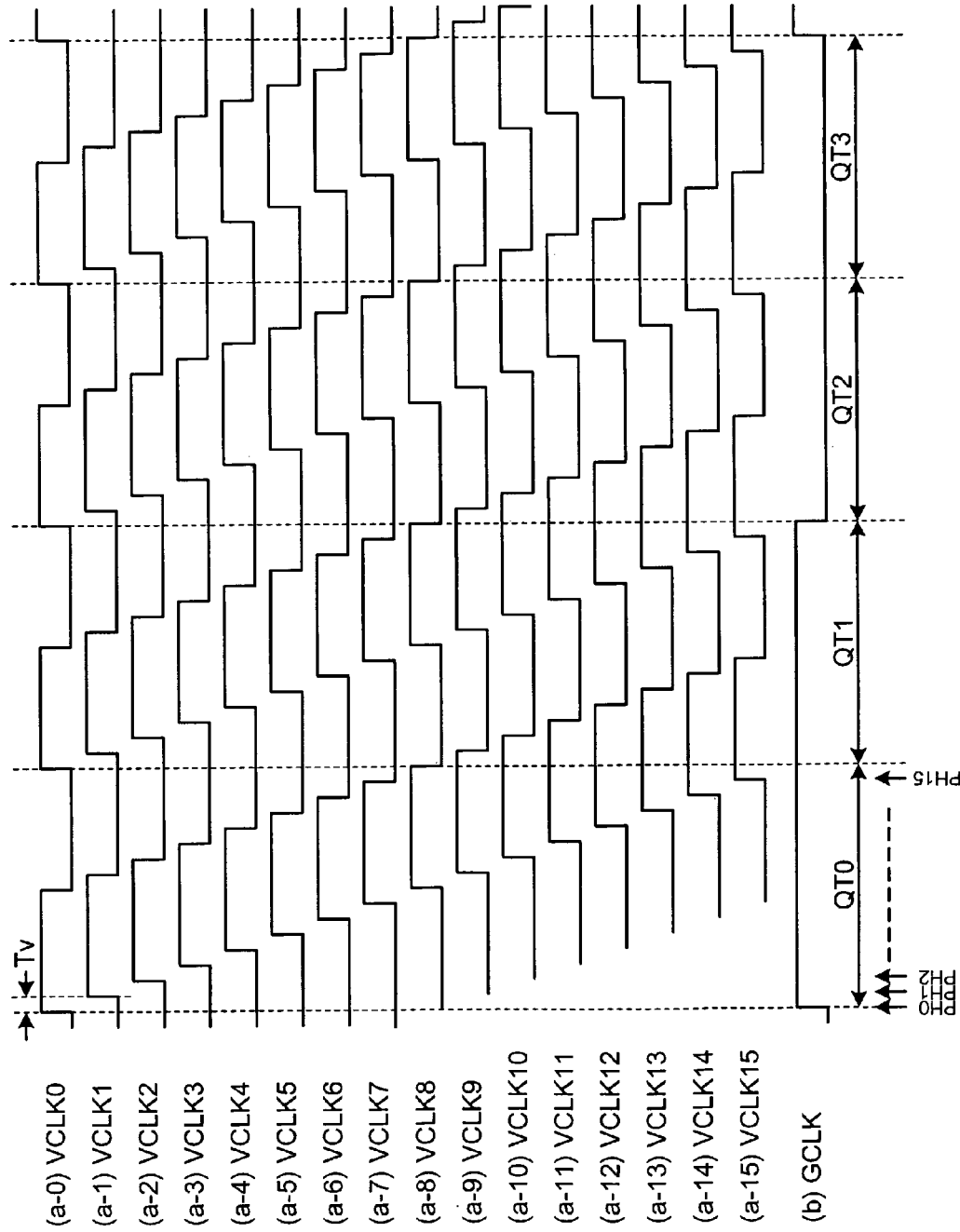
FIG. 13 is a timing chart of clocks generated by a high frequency clock generator 51.

FIG. 13 is a timing chart of clocks generated by the high frequency clock generator 51. Signals (a-0) to (a-15) of FIG. 13 are respective clocks of the multiphase clocks VCLK0 to 15, and have phase differences with mutually equal intervals, and this time interval is set to Tv. A (b) GCLK is a clock obtained by dividing (a-0) VCLK0 by 4. The pixel clock generator 118 (FIG. 12) operates based on this clock GCLK as an operation clock, periods obtained by dividing GCLK by 4 are sequentially called QT0, QT1, QT2, and QT3. Furthermore, times corresponding to respective rising edges of the multiphase clocks VCLK0 to 15 are called PH0 to PH15, and time information QP in GCLK is expressed by a period QT and a phase PH.

The time information QP includes 64 values of 0 to 63, and in the second embodiment, a pixel clock PCLK is generated based on an evenly spaced phase difference Tv in the multiphase clocks. More specifically, calculation on control for pixel clock frequency is implemented by calculating the time information QP (QT, PH) based on the operation clock GCLK.

A first edge detector 52 (FIG. 12) detects rising edge of the first synchronization signal SPSYNC based on the multiphase clocks VCLK0 to 15. When detecting the rising edge of the synchronization signal SPSYNC, the first edge detector 52 outputs a detection pulse SPpls in synchronization with the clock GCLK and time information SPqp indicating a period QT and a phase PH upon rising.

A second edge detector 53 detects rising edge of the second synchronization signal EPSYNC based on the multiphase clocks VCLK0 to 15. When detecting the rising edge of the synchronization signal EPSYNC, the second edge detector 53 outputs a detection pulse EPpls in synchronization with the clock GCLK and time information EPqp indicating a period QT and a phase PH upon rising.

The counting unit 54 counts time according to a pixel-clock-frequency specification signal Mnow sent from a frequency calculator 57, generates a Set signal (including a SETpls signal in synchronization with GCLK and time information SETqp) each time the time reaches Mnow. The counting unit 54 also counts time corresponding to Mnow/2 from the Set signal, and generates a Rst signal (including an RSTpls signal in synchronization with GCLK and time information RSTqp). A unit of time to be counted is each phase difference Tv in the multiphase clocks VCLK0 to 15.

The pixel clock output unit 58 switches between "H" and "L" according to the Set signal and the Rst signal supplied from the counting unit 54, and generates a pixel clock PCLK to be output. Detailed configuration and operation of these are explained later.

The comparator 55 detects a time Tline between two synchronization signals SPSYNC and EPSYNC, and calculates a difference between a reference time and the time Tline counted as an error Lerr of the line, the reference time being preset according to a write frequency and a distance between the two photodetectors PD1 and PD2. In other words, a difference between an appropriate scanning time (reference time) and the scanning time Tline for the line is an error in scanning speed. Here, the comparator 55 counts the number of signals SETpls input during the period until EPpls is input after SPpls is input, and compares the value with the reference value RefN, and further converts the value as an error Lerr of the line from the time information for each pulse. The unit of this error is the phase difference Tv.

A filter 56 is a digital filter that subjects the line error Lerr to filtering and outputs error data Err. The frequency calculator 57 calculates an appropriate pixel clock frequency according to the error data Err, converts the pixel clock frequency to a pixel-clock-frequency specification signal Mnow, and outputs this signal.

When a pixel clock frequency is set to Tp=KTv, where Tp is a pixel clock cycle, and is scanned, an error Err with the target value Tp'(Tp'=K'Tv) is input. Therefore, if K' obtained by the equation (1) is set in the above manner, the pixel clock frequency can be controlled to the target value.

The filter 6 and the frequency calculator 57 play the same functions as the filter 6 and the frequency calculator 7 of FIG. 2, and the configurations thereof are also used, and hence, detailed explanation thereof is omitted.

Figure 14:
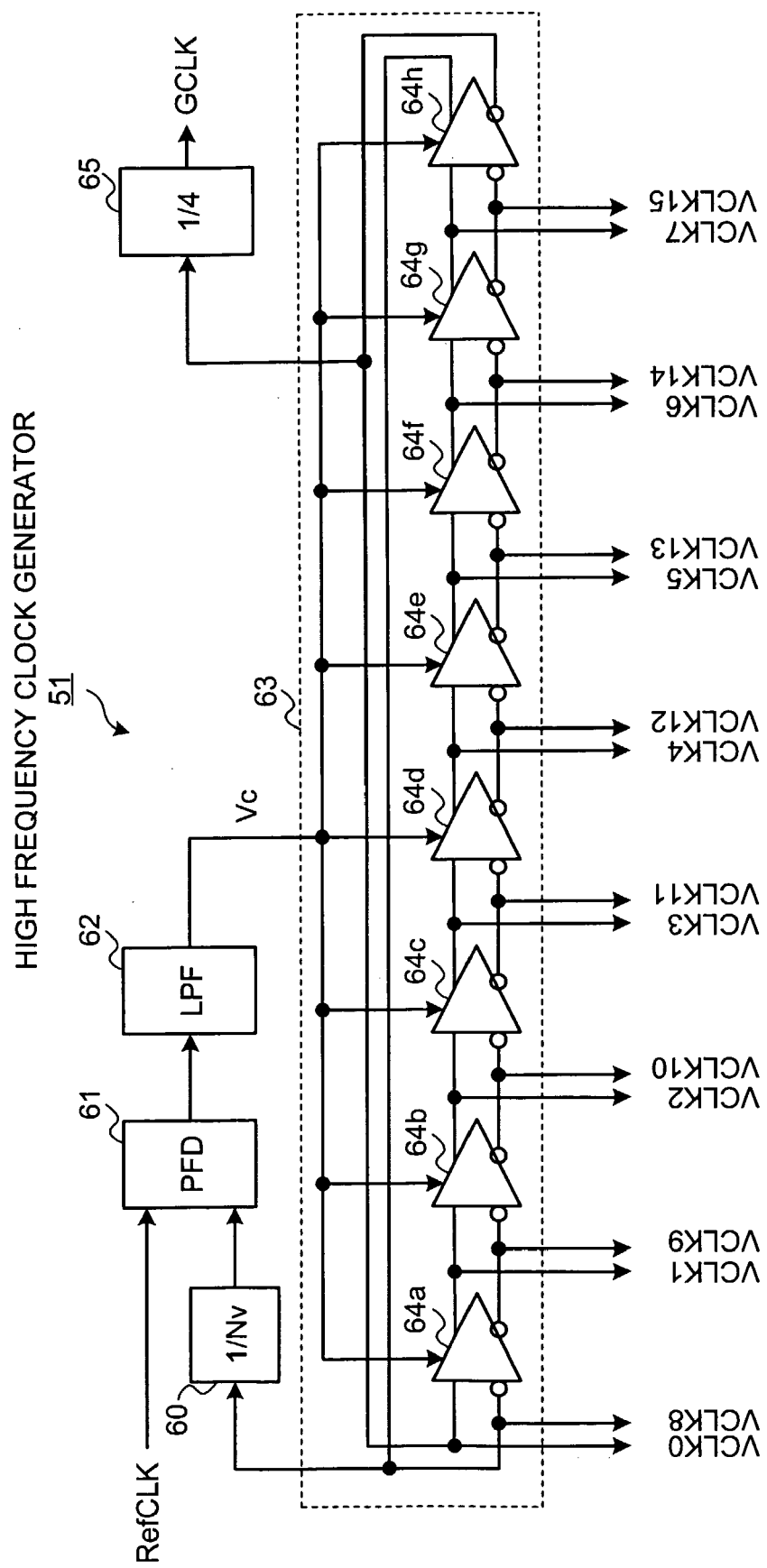
FIG. 14 is a diagram of a configuration of the high frequency clock generator 51.

FIG. 14 is a diagram of the configuration of the high frequency clock generator 51. The high frequency clock generator 51 generates the multiphase clocks VCLK0 to 15 and the clock GCLK for internal operation, from the reference clock RefCLK.

A voltage controlled oscillator (VCO) 63 is formed with a ring oscillator in which eight-stage differential buffers 64*a* to 64*h* are connected to each other, and generates 16-phase clocks VCLK0 to 15. A frequency divider 60 divides one (VCLK8, herein) of the multiphase clocks by Nv.

A phase frequency comparator PFD61 compares phases between the reference clock RefCLK and an output of the frequency divider 60, and drives a charger pump incorporated, based on the phase difference information. A low-pass filter LPF62 smoothes the output of the charger pump and supplies controlled voltage Vc to the VCO 63.

In the differential buffers 64*a* to 64*h* of the VCO 63, each delay amount changes according to the controlled voltage Vc, and phase synchronization control is performed. For example, a 100 MHz clock as the reference clock RefCLK is supplied, and a frequency division ratio Nv is set to 20. In this case, a 2 GHz clock having a phase difference mutually equally spaced can be generated from the multiphase clocks VCLK0 to 15. A frequency divider 65 divides one (VCLK0, herein) of the multiphase clocks VCLK0 to 15 by Q (Q=4), to generate a clock GCLK. As explained in the second embodiment, the number of phases of the multiphase clocks applicable is not limited to 16, but a power-of-two is most desirable for simplicity of calculation. The power-of-two is also most desirable for a frequency division ratio Q for generation of GCLK.

Figure 15:
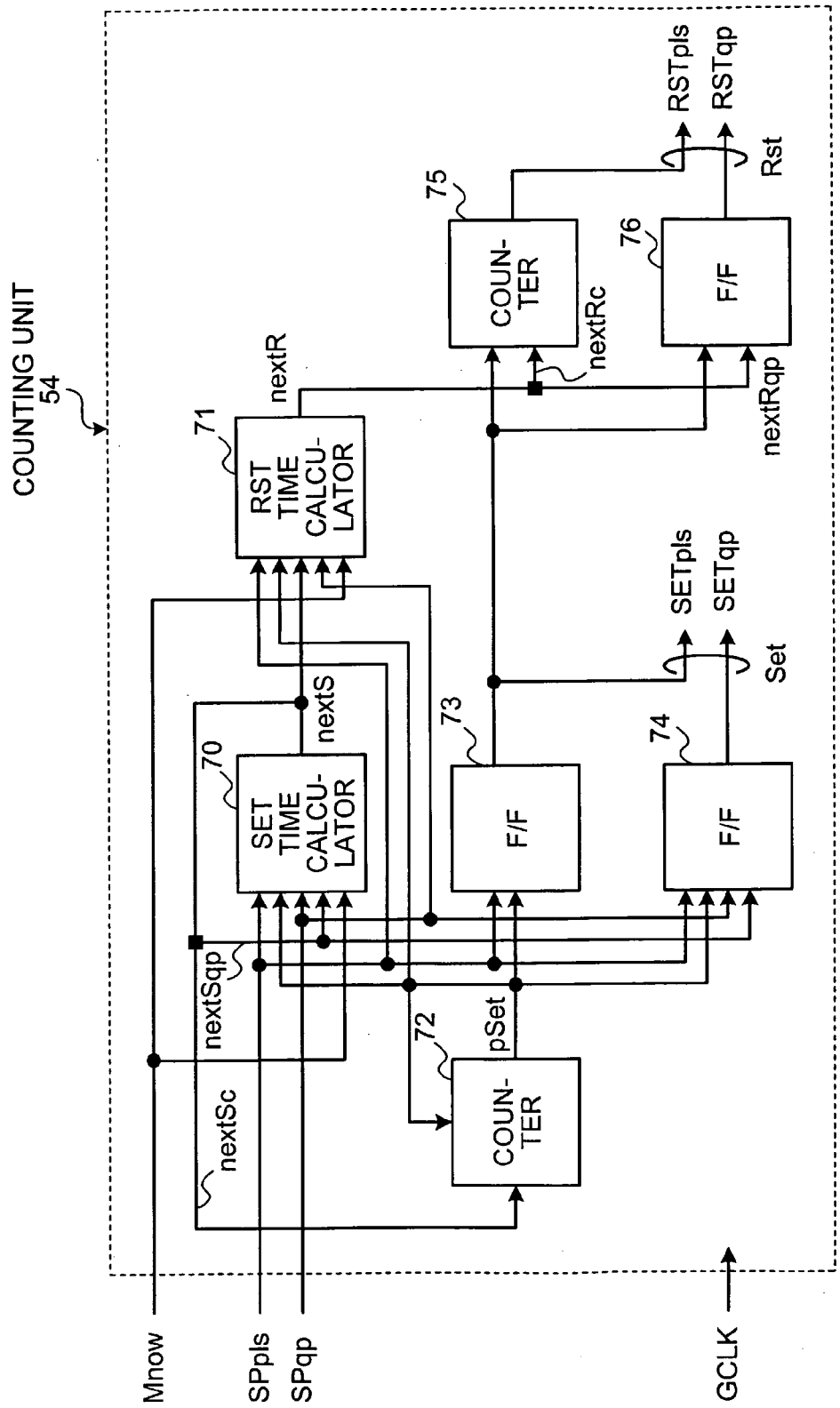
FIG. 15 is a functional block diagram of a counting unit 54.
Figure 16:
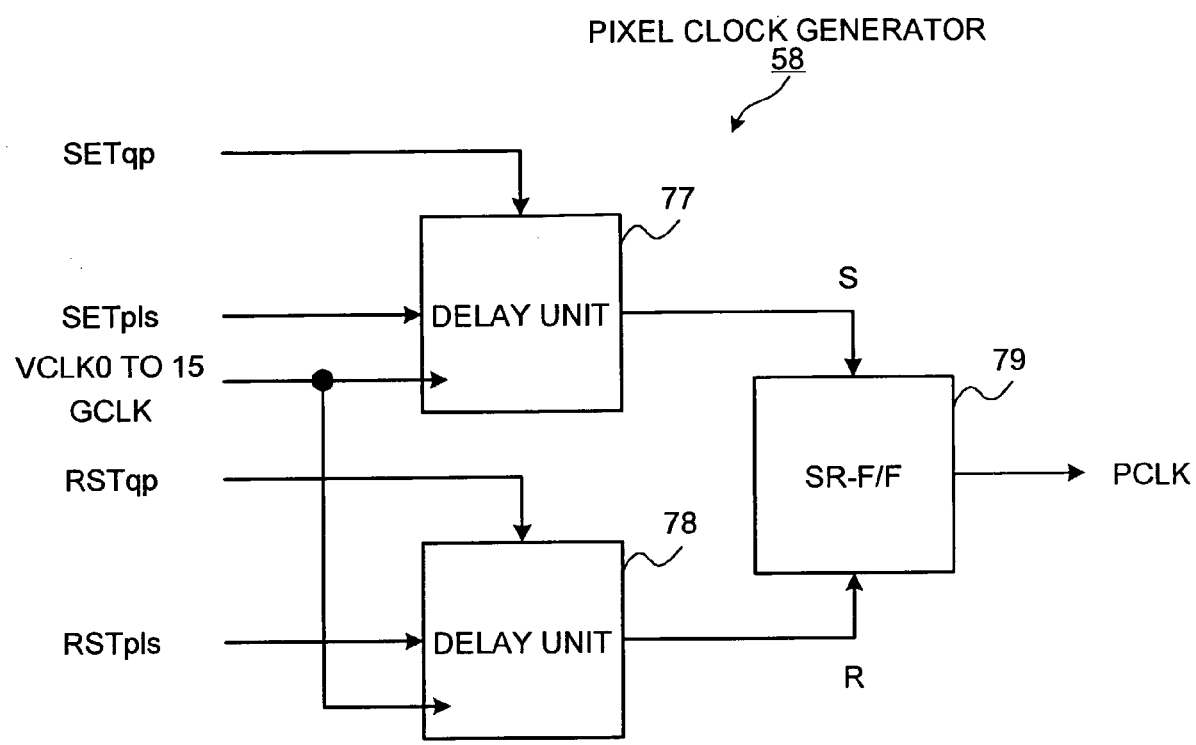
FIG. 16 is a functional block diagram of a pixel clock output unit 58.
Figure 17:
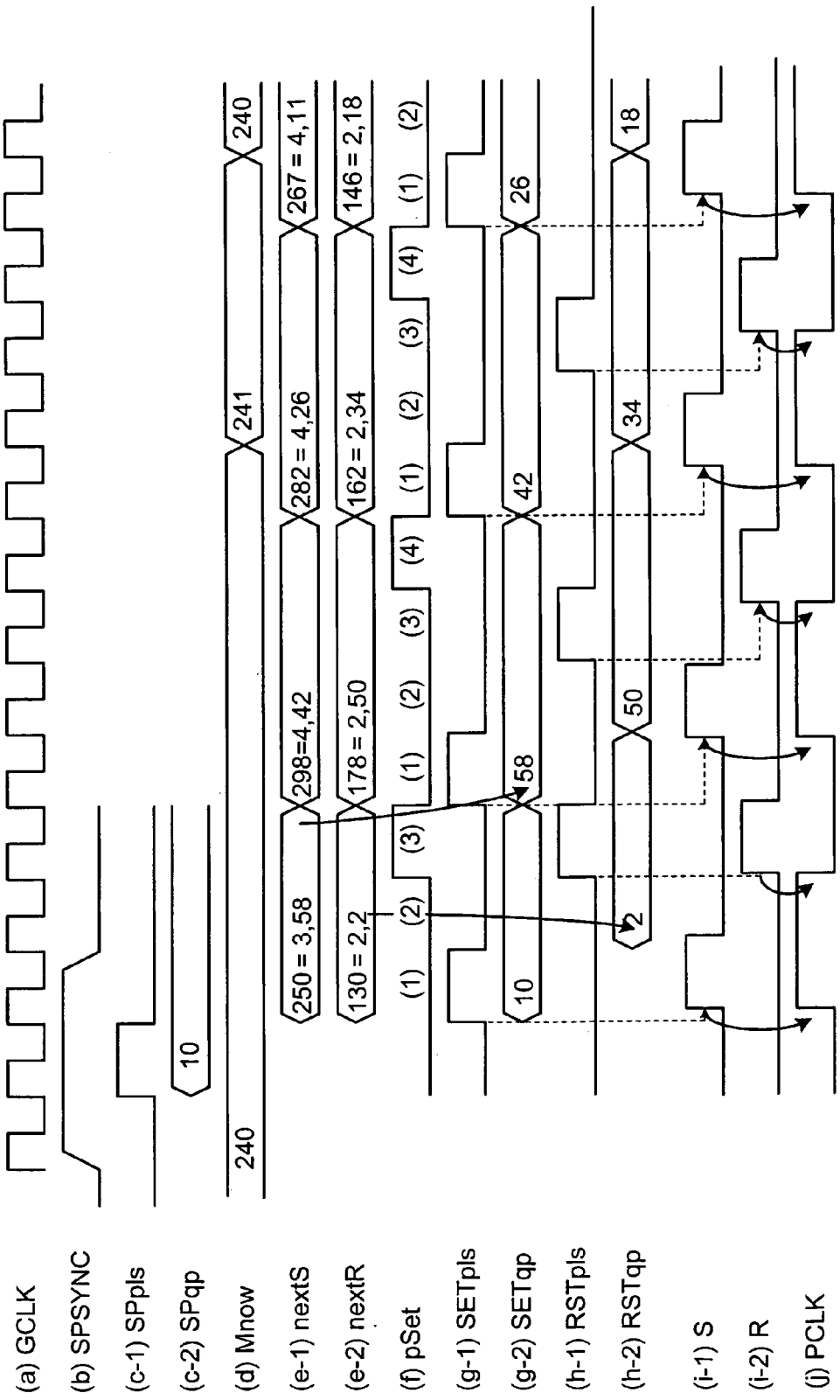
FIG. 17 is a diagram of one example of timing of signals in the counting unit 54 and the pixel clock output unit 58.

FIG. 15 is a functional block diagram of the counting unit 54. FIG. 16 is a functional block diagram of the pixel clock output unit 58. FIG. 17 is a diagram of one example of timing of signals in the counting unit 54 and the pixel clock output unit 58. Detailed configuration and operation for generating the pixel clock PCLK according to the pixel-clock-frequency specification signal Mnow are explained below with reference to these figures.

In FIG. 15, each components of the counting unit 54 operate in synchronization with the clock GCLK. A SET time calculator 70 adds the pixel-clock-frequency specification signal Mnow to time information for current rising edge of PCLK, and calculates Set time information nextS indicating a time of next rising edge of PCLK, and the calculation is renewed by a pSet signal. The Quotient obtained by dividing the Set time information nextS by 64 is nextSc and the remainder is nextSqp. That is, nextSc=nextS [MSB:6], and nextSqp=nextS [5:0].

Furthermore, generation of PCLK is started in phase-synchronization with the rising edge of SPSYNC (specifically, after a predetermined time for signal processing, herein, after 2 GCLK), and time information for initial rising edge of PCLK is set to SPqp.

Likewise, a RST time calculator 71 adds ½ of the pixel-clock-frequency specification signal Mnow to time information for current rising edge of PCLK, and calculates Reset time information nextR indicating a time of next rising edge of PCLK, and the calculation is renewed by the pSet signal. Further, nextRc=nextR [MSB:6], and nextRqp=nextR [5:0]. Addition of Mnow/2 is performed for the purpose of setting duty of PCLK to almost 50%, and when duty 50% is not required, any value to simplify the calculation may be added.

A counter 72 counts a nextSc cycle based on the clock GCLK, and generates the pSet signal. When the pset signal is in "H", the counter is cleared to "1", and when a count value coincides with nextSc, the pset signal is changed to "H".

F/F 73 is a flip-flop that delays the pSet signal and SPpls signal by 1 GCLK to generate a SETpls signal. F/F 74 is a flip-flop that enables the pSet signal and enables nextsqp and SPpls, and latches the SPqp to generate a SETqp signal. The SETpls signal specifies the rising edge of PCLK by a GCLK unit, and specifies time information for rising edge within the GCLK cycle according to the SETqp signal in synchronization with the rising edge. These signals are called the Set signal, which is supplied to the pixel clock output unit 58.

A counter 75 counts a nextRc cycle based on the clock GCLK, and generates a RSTpls signal. When SETpls is in "H", the counter is cleared to "1", and when a count value coincides with nextRc, the RSTpls signal is changed to "H".

F/F 76 is a flip-flop that enables SETpls and latches the nextRqp to generate a RSTqp signal. The RSTpls signal specifies the falling edge of PCLK by a GCLK unit, and specifies time information for falling edge within the GCLK cycle according to the RSTqp signal. These signals are call the Rst signal, and it is supplied to the pixel clock output unit 58.

The SETqp signal and the RSTqp signal may only be active when the respective SETpls signal and the RSTpls signal are in "H". Therefore, control timing of each component is not limited by the second embodiment.

In FIG. 16, a delay unit 77 outputs a pulse S such that SETpls supplied from the counting unit 54 is delayed according to the time information SETqp, based on the multiphase clocks VCLK0 to 15, and also inputs clock GCLK for specifying a period QT in the GCLK cycle. Alternatively, the delay unit 77 may input a period signal QT indicating a period. In this case, the high frequency clock generator 51 generates the QT signal. That is, the pulse S is a pulse such that SETpls is delayed by SETqp·Tv.

Likewise, a delay unit 78 outputs a pulse R such that RSTpls supplied from the counting unit 54 is delayed according to the time information RSTqp, based-on the multiphase clocks VCLK0 to 15, and the pulse R is a pulse such that RSTpls is delayed by RSTqp·Tv. An SR-F/F 79 is a Set-Reset flip-flop that outputs a pixel clock PCLK such that it is set to "H" on the rising edge of the pulse S and it is reset to "L" on the rising edge of the pulse R.

In FIG. 17, (a) is GCLK. When detecting the rising edge of the first synchronization signal (b) SPSYNC, the first edge detector 52 outputs a (c-1) SPpls signal with which the nest one GCLK cycle-becomes "H", and also outputs a (c-2) SPqp signal (10 in this example) indicating with which time of the GCLK cycle this signal rises.

(d) Mnow is a pixel-clock-frequency specification signal supplied from the frequency calculator 57, and is input thereto as shown in FIG. 17. (e-1) nextS indicates a rising time of a next PCLK calculated in the SET time calculator 70. At first, it is configured that PCLK rises in synchronization with the rising edge of SPSYNC, and consequently, the rising edge of the next PCLK is after SPqp+Mnow=250 Tvs. The numeral before the comma on the right side indicates nextSc, and the numeral after the comma indicates nextsqp. A subsequence value thereof nextS becomes nextSqp+Mnow=298.

(e-2) nextR indicates a falling time of a next PCLK calculated in the RST time calculator 71. At first, a value (=130) obtained by adding Mnow/2 to the rising edge of the SPSYNC is falling edge of PCLK, and similarly to (e-1) nextS, the numeral before the comma on the right side indicates nextRc, and the numeral after the comma indicates nextRqp.

(f) pSet is a pulse to be output before one GCLK of SETpls to renew the SETqp signal, and it shifts to "H" when the count value of the counter 72 coincides with nextSc. It is noted that a numeral-in-a-circle of the figure indicates a count value of nextSc.

(g-1) SETpls is a pulse obtained by delaying the SPpls and pSet signals by 1 GCLK, and specifies the rising edge of PCLK by a GCLK unit. (g-2) SETqp is time information for rising edge of PCLK indicating a delay value of the SETpls, and is renewed to the value of (e-1) nextSqp when (f) pSet is in "H". (h-1) RSTpls is a pulse specifying falling edge of PCLK by a GCLK unit, and when the count value of the counter 75 coincides with nextRc, it shifts to "H". (h-2) RSTqp is time information for falling edge of PCLK indicating a delay value of the RSTpls.

(i-1) S is a pulse obtained by delaying (g-1) SETpls by a value of corresponding (g-2) SETqp, and the unit of a delay value is the phase difference Tv in the multiphase clocks VCLK0 to 15. Likewise, (i-2) R is a pulse obtained by delaying (h-1) RSTpls by a value of corresponding (h-2) RSTqp. (j) PCLK is a pixel clock generated as "H" on the rising edge of (i-1) S and as "L" on the rising edge of (i-2) R.

Figure 18:
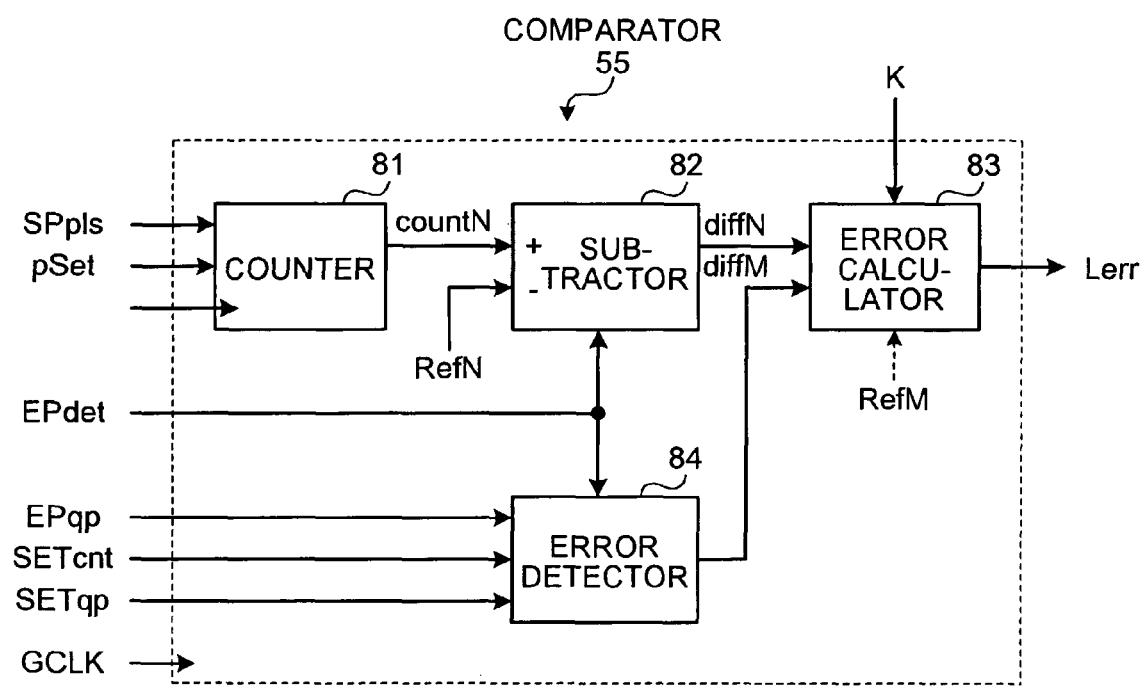
FIG. 18 is a functional block diagram of a comparator 55.
Figure 19:
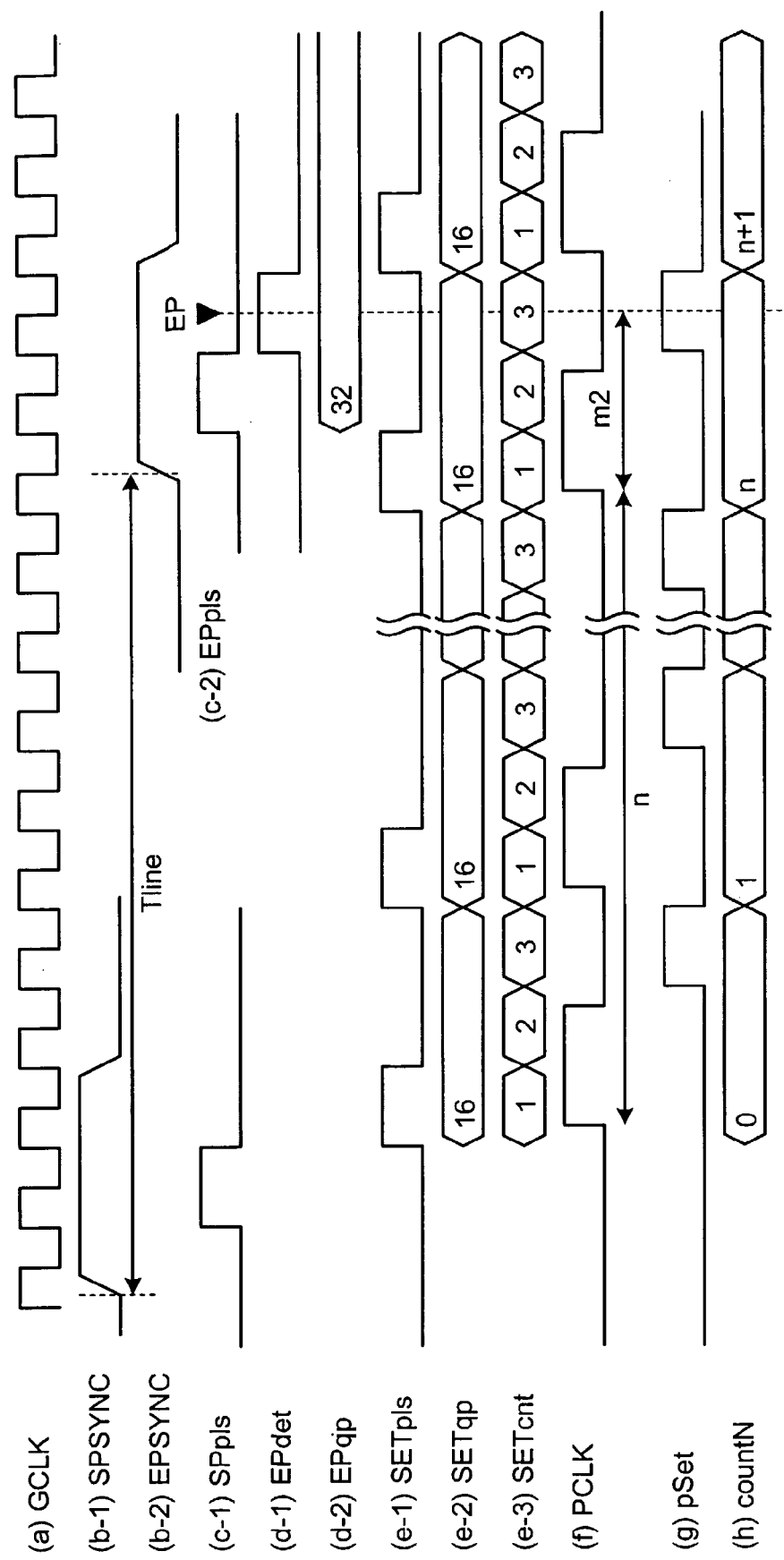
FIG. 19 is a diagram of one example of timing of signals in the comparator 55.

FIG. 18 is a functional block diagram of the comparator 55. FIG. 19 is a diagram of one example of timing of signals of the comparator 55. Detailed operation of the comparator 55 is explained below with reference to FIG. 18 and FIG. 19.

In FIG. 19, (a) is GCLK, (b-1) is SPSYNC, and (b-2) is EPSYNC. The time interval between rising edges of the two signals is the scanning time Tline for the line. (c-1) is SPpls, and (c-2) is EPpls, and (d-2) EPqp is time information for the synchronization signal EPSYNC. Further, (e-1) SETpls and (e-2) SETqp are time information indicating rising edge of PCLK. These signals are previously explained, and hence, explanation thereof is omitted.

(e-3) SETcnt is a count value of the counter 72. In this example, when Mnow=192, counting is constant. At this time, (f) PCLK is generated. Because PCLK is generated in synchronization with timing right after 2 GCLKs from SPSYNC, scanning end time EP is also detected at a point in time at which 2 GCLKs are delayed from EPSYNC. Therefore, an error Lerr is detected from each signal value when (d-1) EPdet obtained by delaying (c-2) EPpls by 1 GCLK is in "H".

(g) is pSet, (h) countN is a count value of a counter 81 such that the value is cleared to '0' by (c-1) SPpls and is incremented by (g) pset. From these, the number n of cycles of PCLK from the start of scanning to the scanning end time EP, and a phase error m2 are detected.

In FIG. 18, the counter 81 is a counter for clearing the value to '0' by SPpls and incrementing the value by pSet, and outputs the count value countN. A subtractor 82 subtracts the reference count value RefN from the value countN (n in FIG. 19) of the counter 81 when EPdet is in "H", and outputs a subtraction result diffN (=n−RefN).

An error detector 84 calculates the following equation where Endqp is SETqp and Endcnt is SETcnt when EPdet is in "H", and calculates a phase difference diffM.

$$\text{diffM} = \text{Endcnt} \cdot \text{Mp} + (\text{EPqp} - \text{Endqp})$$

where Mp is the number of divisions of time information for GCLK, and is 64 in the second embodiment. In the example of FIG. 19, diffM=144.

An error calculator 83 performs the following calculation and outputs an error Lerr using the phase difference Tv in the multiphase clocks VCLK0 to 15 as a unit.

$$\text{Lerr} = \text{diffN} \cdot K + \text{diffM}$$

where TP=K·Tv, and Tp is a cycle of PCLK.

Similarly to FIG. 4, Lerr=diffN·K+diffM−RefM may be calculated, and a set value of the reference time may be set more finely, so that the pixel clock frequency will be controlled more accurately.

An appropriate configuration and operation of the modulation data generator 119 are explained below. The modulation data generator 119 modulates a pulse width according to image data, based on the pixel clock PCLK generated in the pixel clock generator 118 of FIG. 12.

Figure 20:
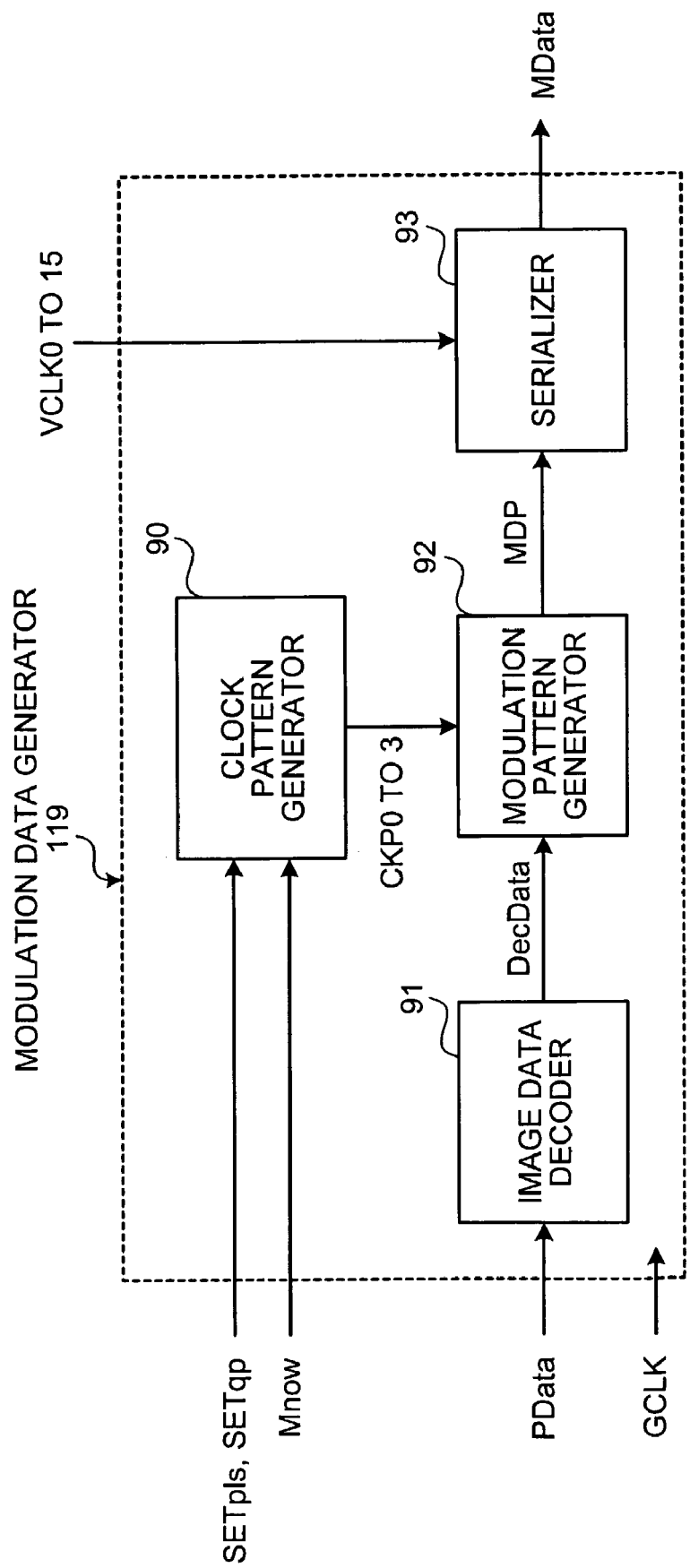
FIG. 20 is a functional block diagram of a modulation data generator 119.
Figure 21:
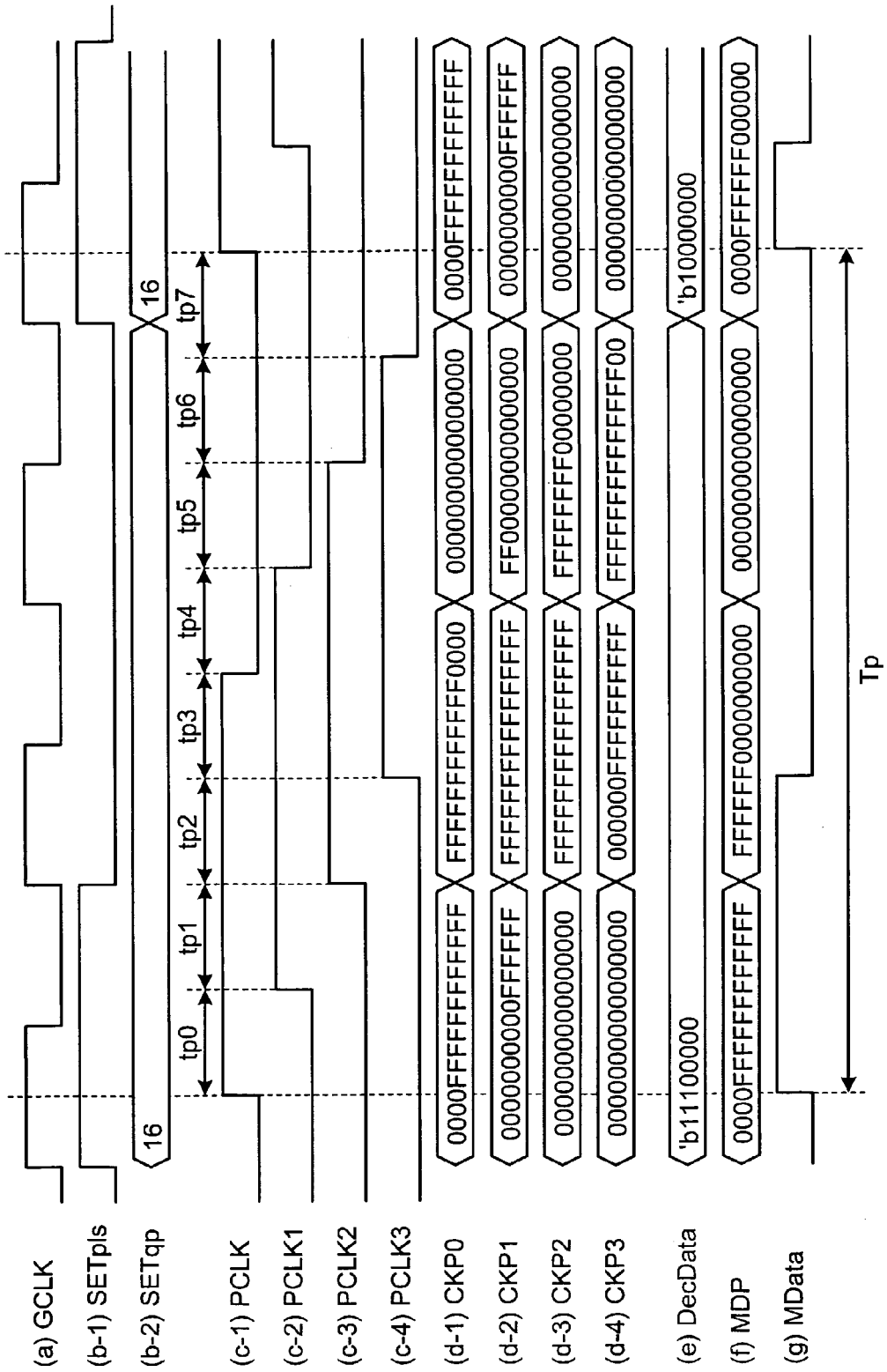
FIG. 21 is a diagram of one example of timing of signals in the modulation data generator 119.

FIG. 20 is a functional block diagram of the modulation data generator 119. FIG. 21 is a diagram of one example of timing of signals in the modulation data generator 119. Detailed operation is explained below with reference to FIG. 20 and FIG. 21. In this example, modulation data MData having been subjected to 8-value pulse width modulation according to the image data PData is generated.

In FIG. 20, the components of the modulation data generator 119 are supplied with GCLK which operates as the reference clock. A clock pattern generator 90 generates a clock pattern signal CKP (indicating CPK0 to 3, and patterns of clocks which are delayed from PCLK by 0, π/8, π/4, and 3π/8 phases, respectively). Specifically, the clock pattern signal CKP corresponds to clocks having a predetermined phase difference of the pixel clock PCLK and is generated from the Set signal, which includes the SETpls signal and the SETqp signal supplied from the pixel clock generator 118 and from the pixel-clock-frequency specification signal Mnow. The clock pattern signal CKP is a signal which changes based on GCLK, and is 64-bit data corresponding to 64 periods Tqp respectively obtained by dividing the GCLK cycle by the time information QP. When the period Tqp is in "H", a corresponding bit is "1", and when "L", a corresponding bit is "0".

The procedure of generating a clock pattern is implemented in the following manner. At first, offset data sofs0 to 3 indicating rising edges of clock patterns and offset data rofs0 to 3 indicating falling edges thereof are obtained. These are sofs0=SETqp, sofs1=SETofs+Mnow/8, sofs2=SETofs+

Mnow/4, and sofs3=SETofs+3Mnow/8, and rofs0 to 3 are obtained by adding Mnow/2 to each of sofs0 to 3, respectively. Then, each bit is converted to "0" in order from a most significant bit (MSB) of the clock pattern CKP for each cycle of GCLK to sofs, "1" from sofs to rofs, and "0" from rofs.

If the offset data are 64 or more, the conversion is delayed by 1 GCLK for each 64 and is performed. For example, when Mnow=192 and SETqp=16, CKP1 is such that sofs=40, rofs=136 (=2GCLK+8). Therefore, a pattern of a first GCLK cycle is as follows: "0" for MSB(=63) to 24-th bit and "1" for 23-th to 0-th bit. A pattern of a second GCLK cycle is All "1", and a pattern of a third GCLK cycle is as follows: "1" for 63 to 56-th bit and "0" for 55 to 0-th bit.

An image data decoder 91 converts the image data PData to 8-value pulse-width modulation data DecData (8 bits). The pulse-width modulation data DecData corresponds to each bit in order of MSB to a least significant bit (LSB) in time sequence of periods in which one cycle of the pixel clock PCLK is time-divided into 8. For example, if PData=3, conversion is performed to DecData='b11100000 ('b indicates binary notation). Alternatively, conversion may be preformed to DecData='b00000111, or a mode switch signal may be added to switch between two modes. This conversion method can be freely selected unless it departs from the scope of the present invention.

A modulation pattern generator 92 generates a modulation pattern signal MDP from the pulse-width modulation data DecData and the clock pattern signals CKP0 to 3. The modulation pattern signal MDP is a signal that varies based on GCLK, similarly to the clock pattern signal CKP, and is 64-bit data corresponding to the 64 periods Tqp respectively obtained by dividing the GCLK cycle by the time information QP.

A serializer 93 serially outputs the modulation pattern signals MDP by each time of Tv in order of MSB (i.e. in order of time) based on the multiphase clocks VCLK0 to 15, to generate modulation data MData.

In FIG. 21, an example of specific numerals is explained below. (a) is GCLK as the reference clock. When (b-1) SETpls and (b-2) SETqp forming the Set signal are supplied as shown in FIG. 21, a pixel clock is generated like (c-1) PCLK. The pixel-clock-frequency specification signal Mnow is assumed to be Mnow=192. Clocks, in which PCLK is delayed by a phase of π/8, π/4, and 3π/8, respectively, are shown in (c-2) PCLK1, (c-3) PCLK2, and (c-4) PCLK2 for explanation though the clocks are not actually generated.

(d-1) to (d-4) are clock pattern signals CKP0 to 3 indicating PCLK, PCLK1 to 3, respectively. Each of them is 64-bit data, which is shown in order of time from MSB to LSB, and in hexadecimal notation. Therefore, patterns (called PT0 to 7 in order of time) can be generated. More specifically, the patterns indicate periods (tp0 to tp7) obtained by time-dividing the pixel clock PCLK into 8. In other words, PT0=CKP0& CKP1, PT1=CKP1&CKP2, ..., PT7=CKP3&CKP0. Mark "&" herein indicates the logical AND, and "" indicates negative AND.

(e) DecData is pulse-width modulation data, and the data is assumed to be converted as shown in FIG. 21. (f) MDP is a modulation pattern signal, which is obtained by calculating ({64{DecData [7-i]}} & PTi) first when i is changed from 0 to 7, and implementing the logical OR operation of these. Here, {64{DecData [i]}} is data obtained by serially connecting DecData [i] for 64 bits.

The modulation pattern signals generated in the above manner are serialized to enable generation of modulation data as (g) MData. In this example, pulses subjected to pulse width modulation are generated in such a manner that a first ⅜ period of a PCLK period Tp is in "H" and the remaining is in "L".

Instead of generation of the clock pattern signals CKP0 to 3 in which phase of each pixel clock is shifted by π/8 each, patterns PT0 to PT7 indicating respective periods, which are obtained by time-dividing one cycle of the pixel clock PCLK into 8, are generated and a modulation pattern signal MDP may be generated from these patterns and the pulse-width modulation data DecData.

The case where 8-value pulse width modulation is performed is explained in the second embodiment, but, any other modulation methods can be used. For example, when 16-value pulse width modulation is performed, the image data decoder 91 converts image data PData to 16-bit pulse-width modulation data DecData, the clock pattern generator 90 generates 8 clock pattern signals CKP0 to 7 in which each phase is shifted by each π/16 with respect to the pixel clock PCLK, and the modulation pattern generator 92 generates a modulation pattern signal MDP in the same manner.

The example of this configuration may be used for the pixel clock output unit 58 of FIG. 12. More specifically, the pixel clock output unit 58 generates a clock pattern PCKP of the pixel clock PCLK (the clock pattern signal CKP0 can be used), and serially outputs clock patterns PCKP by each time of Tv in order of MSB i.e. in order of time, based on the multiphase clocks VCLK0 to 15, and it is thereby possible to generate the pixel clock PCLK.

When a pixel clock output unit is configured to use SR-F/F in the final stage as shown in FIG. 16, many of SR-F/Fs do not operate accurately if a set pulse S and a reset pulse R overlap in the same period. Therefore, generation of a pixel clock frequency (up to a frequency of ½ of GCLK) is restricted so that the set pulse S and the reset pulse R (of which pulse width corresponds to one cycle of GCLK) do not overlap each other. On one hand, when the pixel clock output unit includes the serializer as explained above, this type of restriction is not needed, but a pixel clock to be generated can be expanded up to a high frequency. Conversely, an internal clock GCLK can be divided into lower frequencies, and a consumption current can be reduced more. On the other hand, the configuration of FIG. 16 is very simple and allows reduction of a circuit scale. Therefore, it is only necessary to select the configuration of the pixel clock output unit according to required performance.

In the second embodiment of the pixel clock generator, as explained above, a pixel clock is generated based on the multiphase clocks VCLK0 to 15 generated with high accuracy, and a pixel clock frequency is controlled according to a variation in scanning time. Therefore, even if there is a variation in average scanning speed, it is possible to generate a pixel clock allowing error correction with high accuracy. Furthermore, a pixel clock frequency is controlled corresponding to each facet of the polygon mirror. Therefore, even if there is an error in scanning speed for each facet, it is possible to generate a pixel clock allowing correction of the error with high accuracy.

The generation of a pixel clock can be controlled accurately in the unit of a phase difference Tv in the multiphase clocks VCLK0 to 15. Therefore, an oscillation frequency of a multiphase clock does not have to increase, which allows easy design of a circuit and reduction in consumption current. For example, if a pixel clock is generated with resolution equivalent to that of the first embodiment, the oscillation frequency of the multiphase clock requires only 1/16. Conversely, if the equivalent oscillation frequency is used, the resolution of pixel clock to be generated can be improved to 16 times. That is, a high precision pixel clock can be generated. Furthermore, most part of the pixel clock generator is configured to operate with a clock GCLK which is obtained by further dividing one of the multiphase clocks, which allows further decrease in operating frequency and also reduction in consumption current.

Furthermore, by applying the pixel clock generator to the image forming apparatus, an image is formed based on the pixel clock such that the error in the scanning speed is highly accurately corrected, which enables provision of the image forming apparatus capable of forming a high quality image.

An image forming apparatus according to a third embodiment of the present invention has a different point from the first embodiment in that a multi-beam scanning optical system is adopted. The multi-beam scanning optical system radiates light beams emitted from a plurality of light sources to a photosensitive element using a shared scanning optical system, and forms an image (electrostatic latent image) thereon.

Figure 22:
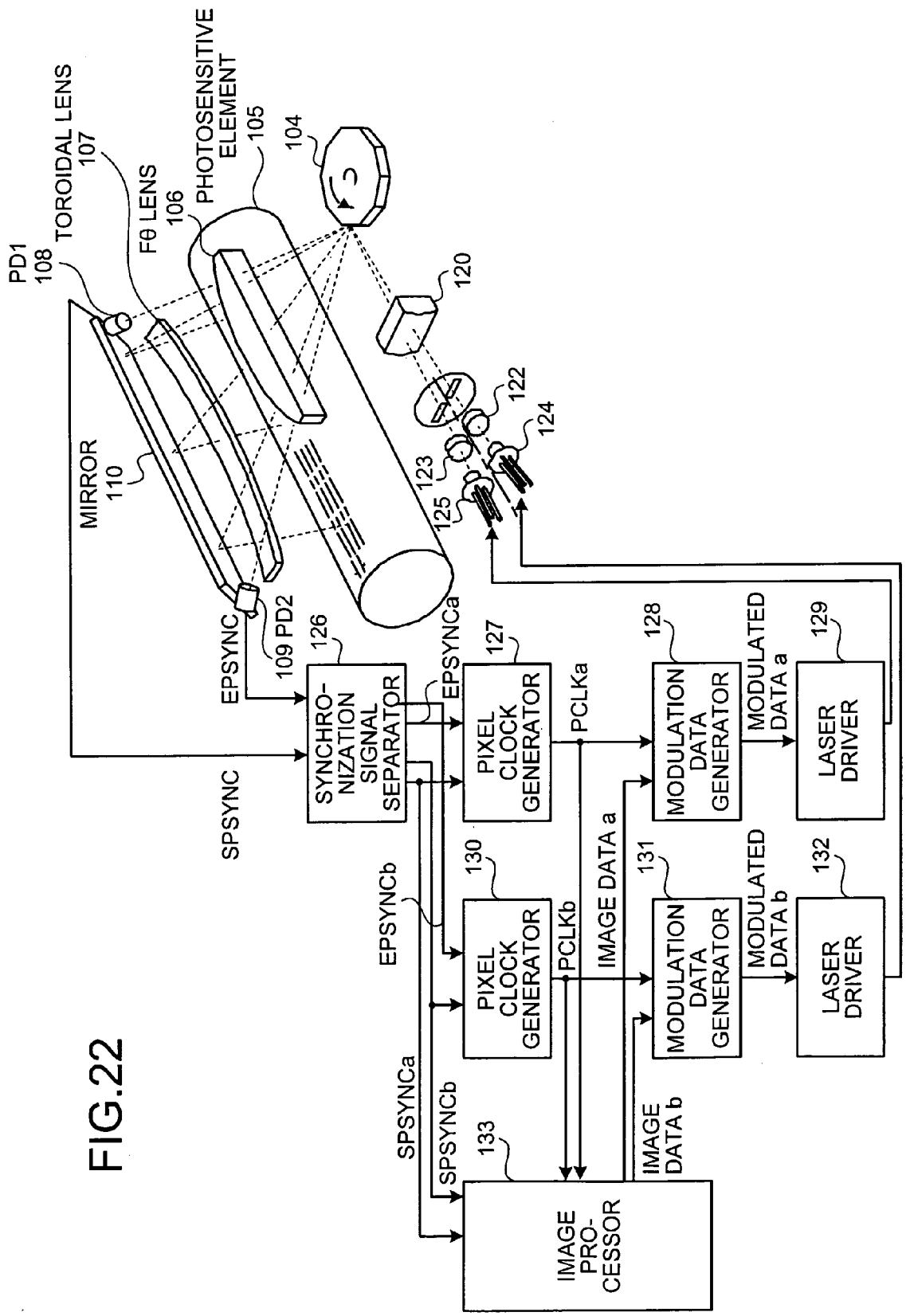
FIG. 22 is a diagram for explaining an image forming apparatus according to a third embodiment of the present invention.

FIG. 22 is a diagram for explaining the image forming apparatus according to the third embodiment. This embodiment is configured to include two sets of a pixel clock generator, a modulation data generator, and a laser driver, and to drive two semiconductor lasers by the respective laser drivers.

In FIG. 22, layout is provided so that semiconductor lasers 124 and 125 cause their optical axes to coincide with those of collimating lenses 122 and 123, have an emission angle symmetrically with respect to a main scanning direction, and emission axes cross each other at a point of reflection on the polygon mirror 104. The beams emitted respectively from the semiconductor lasers 124 and 125 are integrally scanned by the polygon mirror 104 through a cylindrical lens 120, and an image is formed on the photosensitive element 105 through the fθ lens 106, the mirror 110, and the toroidal lens 107. Image data for one line is stored in an image processor 133 for each light source, is read out for one facet of the polygon mirror, and two lines each are concurrently written therein.

The photodetector PD1 (108) and the photodetector PD2 (109) are provided on both ends of the mirror 110, so that the start and the end of scanning are detected. More specifically, the laser beams emitted from the two light sources and reflected by the polygon mirror 104 sequentially enter the photodetector PD1 (108) before one-line scanning is performed on the photosensitive element 105, and enter the photodetector PD2 (109) after the scanning.

The photodetectors convert the laser beams having entered, to the first synchronization signal SPSYNC and the second synchronization signal EPSYNC, respectively, and supply them to a synchronization signal separator 126. The two light sources are arranged so as to scan the laser beams over the photosensitive element 105 with a time lag. Therefore, the synchronization signal separator 126 separates the first synchronization signal SPSYNC to a synchronization signal SPSYNCa and a synchronization signal SPSYNCb corresponding to the respective light sources, and also separates the second synchronization signal EPSYNC to a synchronization signal EPSYNCa and a synchronization signal EPSYNCb corresponding to the respective light sources.

Figure 23:
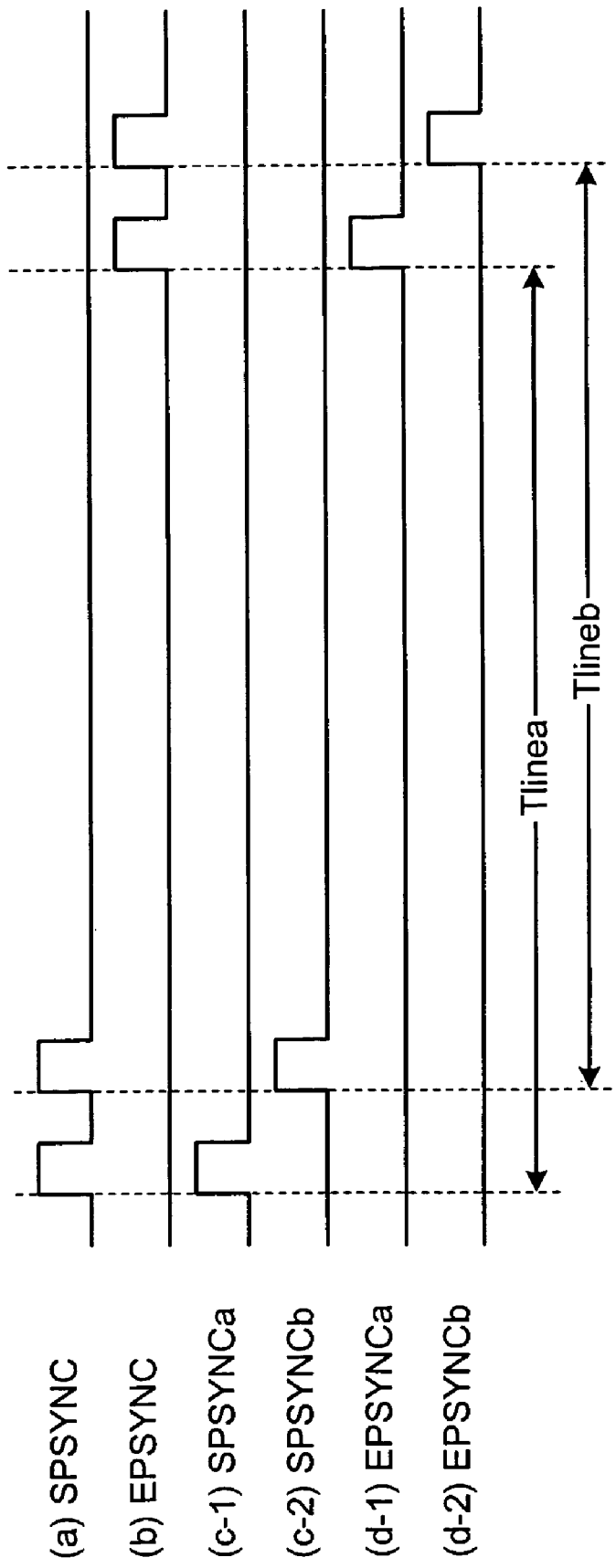
FIG. 23 is a diagram of one example of timing of synchronization signals from photodetectors.

FIG. 23 is a diagram of one example of timing of synchronization signals from photodetectors. (a) is the first synchronization signal SPSYNC, and (b) is the second synchronization signal EPSYNC. If the laser beam of the semiconductor laser 125 is previously scanned, the synchronization signal (a) SPSYNC is separated to those like (c-1) SPSYNCa and (c-2) SPSYNCb. Likewise, the synchronization signal (b) EPSYNC is separated to those like (d-1) EPSYNCa and (d-2) EPSYNCb.

SPSYNCa and EPSYNCa as one group of the synchronization signals separated are supplied to a pixel clock generator 127 (FIG. 22), and SPSYNCb and EPSYNCb as the other group thereof are supplied to a pixel clock generator 130.

The pixel clock generator 127 measures a scanning time Tlinea from the two synchronization signals SPSYNCa and EPSYNCa, and generates a pixel clock PCLKa of a frequency obtained so that the preset fixed number of clocks falls within the time interval. The image processor 133 generates image data "a" based on the pixel clock PCLKa.

A modulation data generator 128 generates modulation data "a" from the image data a received, based on the pixel clock PCLKa, and drives the semiconductor laser 125 through a laser driver 129.

Likewise, the pixel clock generator 130 generates a pixel clock PCLKb from the two synchronization signals SPSYNCb and EPSYNCb. A modulation data generator 131 generates modulation data "b" from image data "b" generated in the image processor 133 based on the pixel clock PCLKb, and drives the semiconductor laser 124 through a laser driver 132.

The pixel clock generators 127 and 130 serve the same functions as these of the pixel clock generator 111 of FIG. 1, and the pixel clock generator according to the first embodiment and the second embodiment can be used. Therefore, explanation of the detailed configuration and operation is omitted. Explanation of the modulation data generators 128 and 131 is also omitted.

If each of the high frequency clock generators 1 and 51 is commonly used by the pixel clock generators 127 and 130, minimization of the circuit scale and reduction in consumption current are achieved. Further, the two edge detectors 2 and 3 (or 52 and 53) may be configured so as to be commonly used by the pixel clock generators 127 and 130 to detect synchronization signals, and to separate the synchronization signals detected.

Furthermore, because part of the calculation processes of the filters 6 and 56 and the frequency calculators 7 and 57 operates only once in each line, these portions are to be shared, and calculations of the pixel clock frequencies may be processed on a time basis.

In the third embodiment, speed variation can be highly accurately corrected and a high quality image can be formed because frequencies of the pixel clocks PCLKa and PCLKb are independently controlled according to respective variations in scanning speed, even if there is an error in scanning speed that occurs in each light source, which is the problem (3) described in the conventional technology. That is, the frequencies are independently controlled even if the wavelengths of the two light sources are different and scanning speeds of the two beams are different from each other caused by variations in the scanning speed due to chromatic aberration of the scanning optical system, in other words, even if the scanning times Tlinea and Tlineb with the two beams of FIG. 23 discretely vary.

The multi-beam scanning optical system has another configuration including not a plurality of semiconductor lasers but a single semiconductor laser array, from which a plurality of laser beams are emitted and scanned using a common scanning optical system. The present invention is also applicable to this type of optical system. There are various embodiments on the multi-beam scanning optical system, but the present invention is applicable to any configuration of the multi-beam scanning optical system. Therefore, graphic representation of detailed configurations and explanation thereof are omitted.

Fourth Embodiment

An image forming apparatus according to a fourth embodiment of the present invention has a different point from the first embodiment in that the image forming apparatus includes a plurality of photosensitive elements for multiple color. The image forming apparatus has photosensitive elements separately provided corresponding to colors of cyan, magenta, yellow, and black, has a plurality of scanning optical systems provided corresponding to the respective photosensitive elements, and forms images (electrostatic latent images) corresponding to the colors on the photosensitive elements respectively. The images of the colors are transferred to one image forming medium (e.g., paper) to form a color image.

Figure 24:
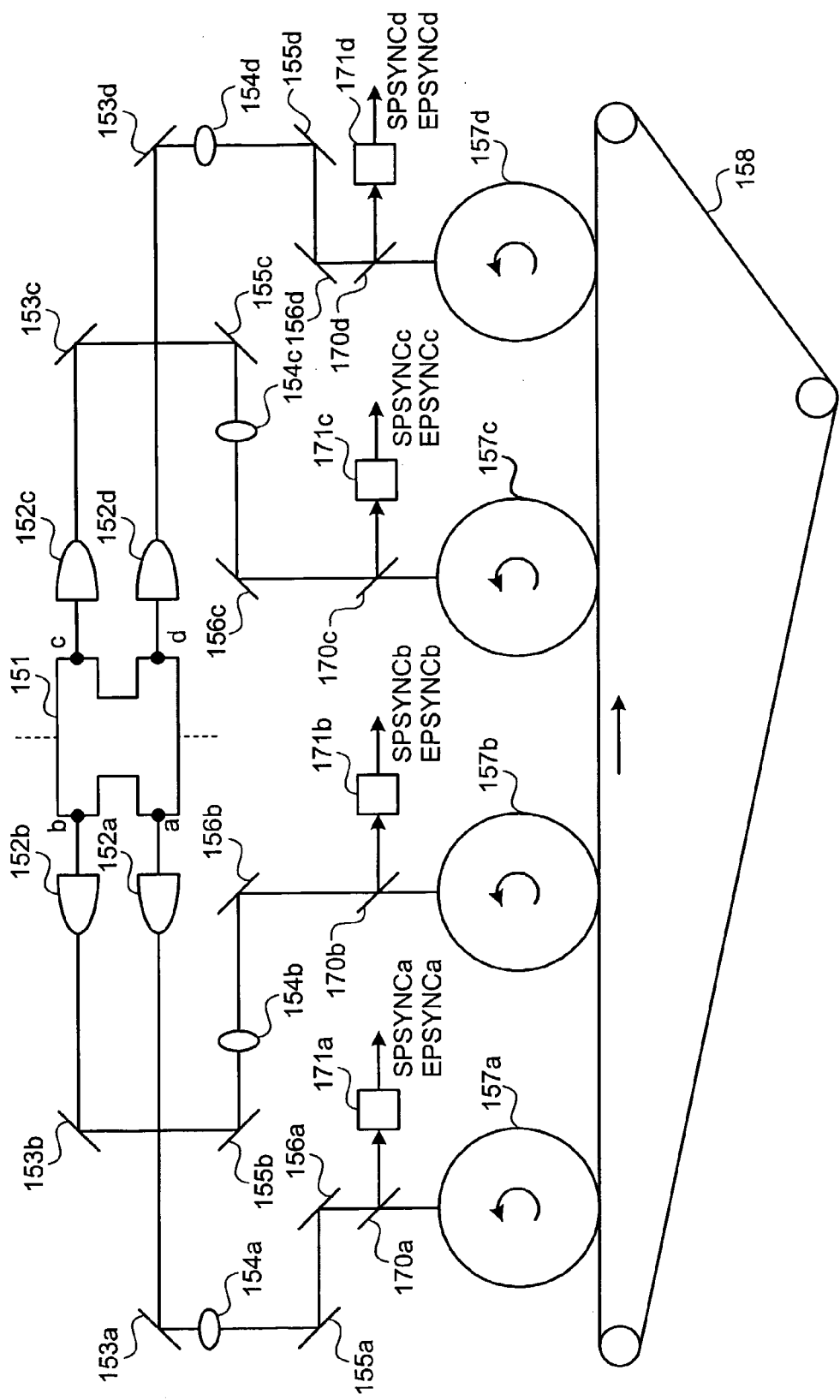
FIG. 24 is a schematic diagram of mainly a mechanical operation portion of an image forming apparatus according to a fourth embodiment of the present invention.
Figure 25:
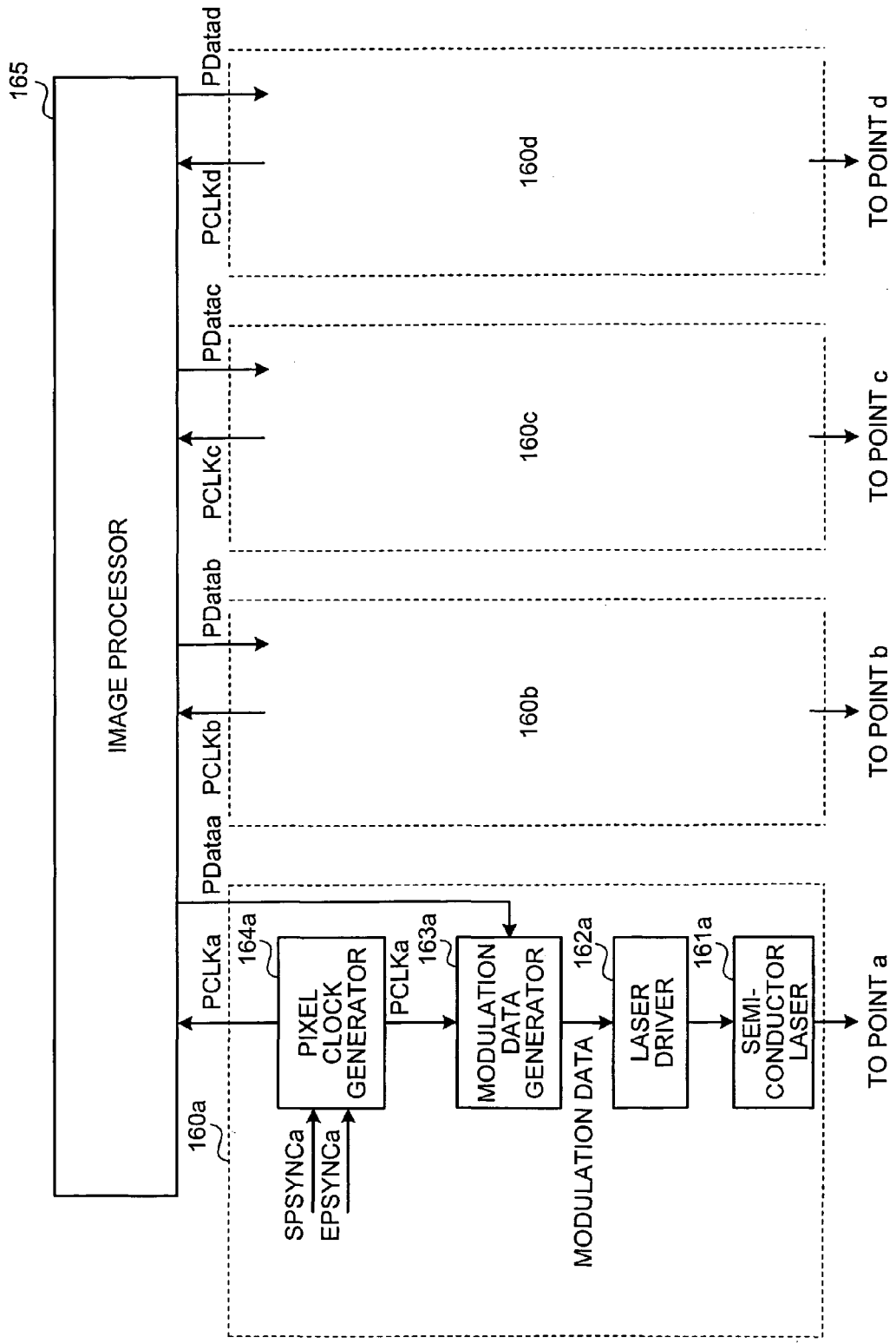
FIG. 25 is a schematic diagram of mainly an image processing portion of the image forming apparatus according to the fourth embodiment.

FIG. 24 is a schematic diagram of mainly a mechanical operation portion of the image forming apparatus according to the fourth embodiment. FIG. 25 is a schematic diagram of mainly an image processing portion of the image forming apparatus according to the fourth embodiment.

The image forming apparatus according to the fourth embodiment is implemented simply by arranging four units of the image forming apparatus of FIG. 1. A configuration of sharing a part of the scanning optical system can also be used for downsizing, but in this case, light paths are different from each other. Therefore, this type of image forming apparatus is better thought of as one having a plurality of different image forming apparatuses. FIG. 24 indicates one example of this type of configuration, and is vertical cross section in which only part of units are shown.

A polygon mirror 151 of FIG. 24 has a two-stage configuration, rotates around a dotted line as an axis, and is commonly used by scanning optical systems. A laser beam emitted from a semiconductor laser 161a is reflected at a point "a" on the polygon mirror 151 through a collimating lens and a cylindrical lens (both of them are not shown). Likewise, laser beams emitted from semiconductor lasers 161b to 161d (not shown) are reflected at points "b" to "d" on the polygon mirror 151. Each laser beam reflected by the polygon mirror scans a photosensitive element 157 through scanning lenses 152 and 154, and return mirrors 153, 155, and 156 (the scanning direction of the beams i.e. the main scanning direction is a direction perpendicular to the drawing), and forms an image (electrostatic latent image) thereon. It is noted that letters a to d at respective ends of reference numerals of the components (e.g., 152a to 152d) or of reference codes in FIG. 24 and FIG. 25 correspond to a to d of the semiconductor lasers 161a to 161d, and that images corresponding to the colors of yellow, magenta, cyan, and black are formed, respectively. It is also noted that the reference numerals for the same type of components with the letters are represented by one reference numeral without the letters unless otherwise specified. The images of the colors formed on the photosensitive elements 157a to 157d are transferred to an image forming medium, which is placed on an intermediate transfer belt 158 and moves along the direction of arrow, to form a color image.

At this time, mirrors 170, arranged on both sides which are beyond an effective scanning range, guide the beams to detectors (photodetectors) 171. The detectors detect the start and the end of scanning, and convert the beams to the synchronization signals SPSYNC and EPSYNC, respectively. These synchronization signals SPSYNC and EPSYNC are supplied to a pixel clock generator 164 in the above manner, where a pixel clock PCLK is generated, and the pixel clock being such that its frequency is controlled so as to correct an error in scanning speed. An image processor 165 generates image data PData based on the pixel clock PCLK. A modulation data generator 163 generates modulation data from the image data PData received, based on the pixel clock PCLK, and drives the semiconductor laser 161 through a laser driver 162. These processes are performed in the above manner for each corresponding beam of the colors. In FIG. 25, emission controllers 160b to 160d have the same configuration as that of an emission controller 160a.

The pixel clock generator according to any one of the embodiments can be used for the pixel clock generator 164. Scanning times in scanning optical systems are different from each other due to effects of manufacturing accuracy and assembly accuracy of the parts for each scanning optical system, and due to effects of deformation caused by change over time or the like, and a distance between two photodetectors for detecting the start and the end of scanning is different from other distances due to their assembly accuracy. Therefore, the reference value RefN, which becomes reference of pixel clock frequency control, is previous determined upon manufacture of an image forming apparatus for each scanning optical system, and the value is provided as the reference value RefN to the pixel clock generator 164. However, the reference value RefN as reference of the pixel clock frequency control is desirably determined again when image degradation occurs caused by change over time or the like.

A position where the start of scanning is detected by the synchronization signal SPSYNC may sometimes be different from another in each scanning optical system. Therefore, it is configured to start writing an image (which is called write start offset) after a predetermined time from rising edge of the synchronization signal SPSYNC (after a predetermined cycle of the pixel clock PCLK), and the write start offset is obtained in each scanning optical system.

Figure 26:
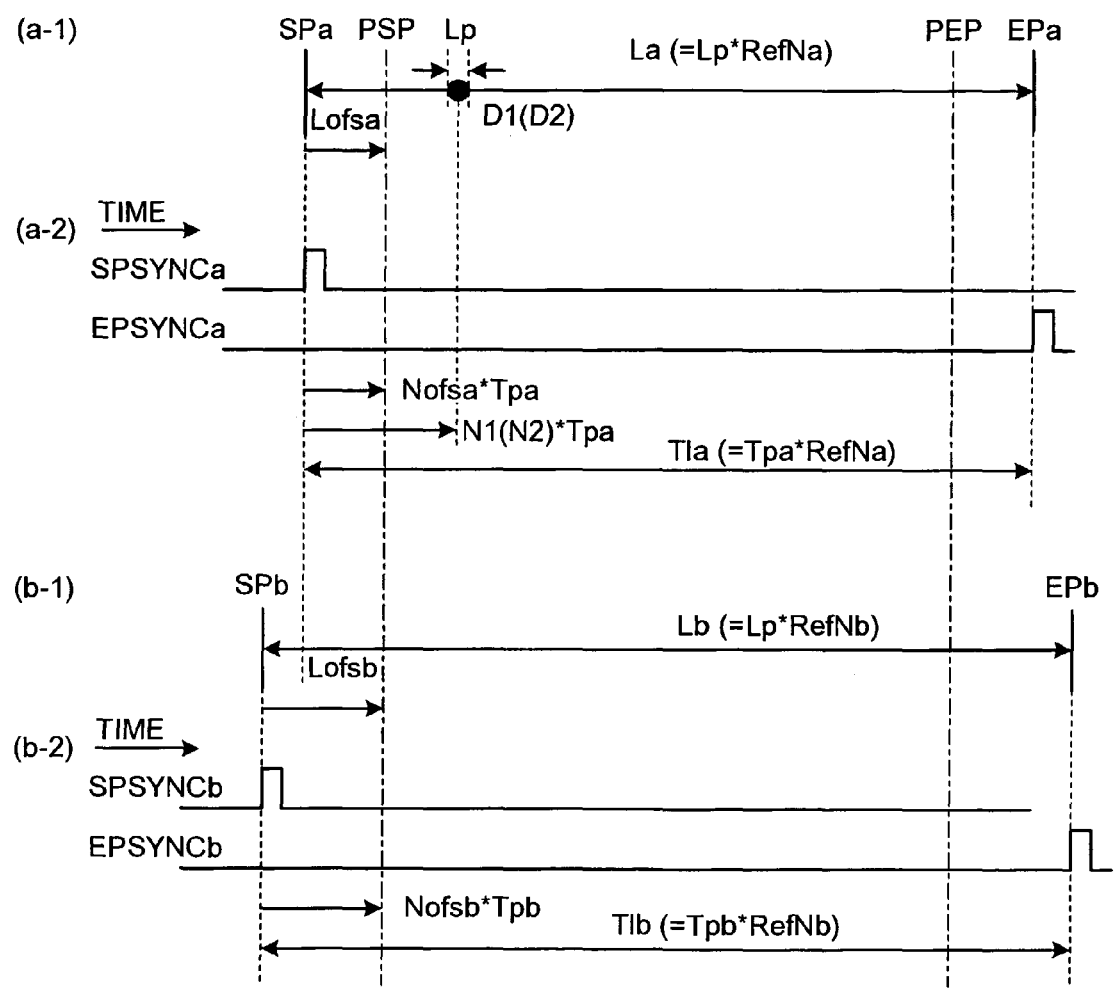
FIG. 26 is a diagram of a relation between an operation time and a scan width in each scanning optical system.

FIG. 26 is a diagram of a relation between an operation time and a scan width in each scanning optical system. (a-1) indicates a scan width for one line of a scanning optical system a. SPa and EPa indicate positions of detectors for detecting the start and the end of scanning respectively, corresponding to points on a photosensitive element. La/Lp=RefNa, where La is a length between the two positions and Lp is one dot width of an image, is the number of dots in one line, and this number is set as the reference value RefN. A range where an image is actually formed is set to an area between PSP and PEP. (a-2) indicates a scanning time for one line in the scanning optical system a.

The synchronization signals SPSYNC and EPSYNC are detected respectively corresponding to the start position SP and the end position EP of scanning, and the time interval between the two is set to a scanning time T1a. The scanning time T1a varies caused by the various factors as explained above, but a pixel clock cycle Tpa is controlled so that a relation of Tpa=T1a/RefNa is satisfied. Therefore, write pulses to be output, after a predetermined PCLK cycle (N1 and N2) from SPSYNC, form dots always on the same position along a scanning line (D1 and D2). Actual start of writing an image is set to the time after a Nofsa cycle.

Likewise, (b-1) indicates a scan width for one line of a scanning optical system b. Lb/Lp=RefNb, where Lb is a length between a start position of scanning SPb and its end position EPb, is set as the reference value RefN. (b-2) indicates a scanning time for one line in the scanning optical system b, and a time interval between the synchronization signals SPSYNC and EPSYNC is set to a scanning time Tlb. A pixel clock cycle Tpb is also controlled in the above manner so that a relation of Tpb=Tlb/RefNb is satisfied. Furthermore, write start offset Nofsb of an image is set according to a difference in length between the start positions of scanning SPa and SPb. Thus, the range PSP to PEP where an image is actually formed coincides with the other irrespective of scanning optical systems.

In the image forming apparatus according to the fourth embodiment, even if an error of scanning speed including a speed error of each scanning optical system occurs caused by various factors, frequencies of pixel clock PCLK are discretely controlled according to a difference and variations in scanning speeds corresponding to colors that form an image. Therefore, it is possible to obtain a color image formed without color shift, degradation of color reproduction and resolution, i.e. with high image quality.

(Hardware Configuration, Etc)

Figure 27:
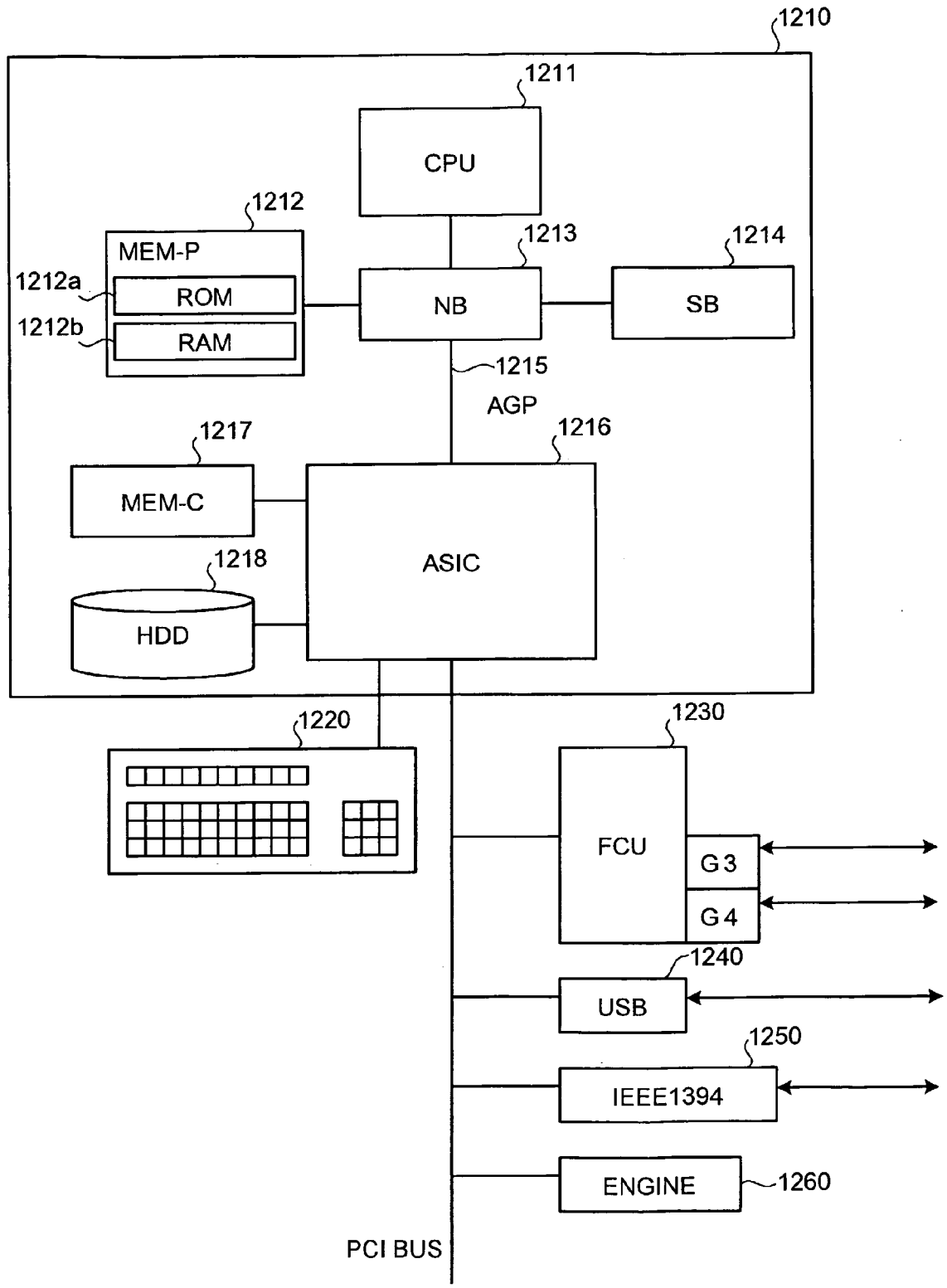
FIG. 27 is a block diagram of a hardware configuration of each image forming apparatus according to the embodiments.
Figure 28:
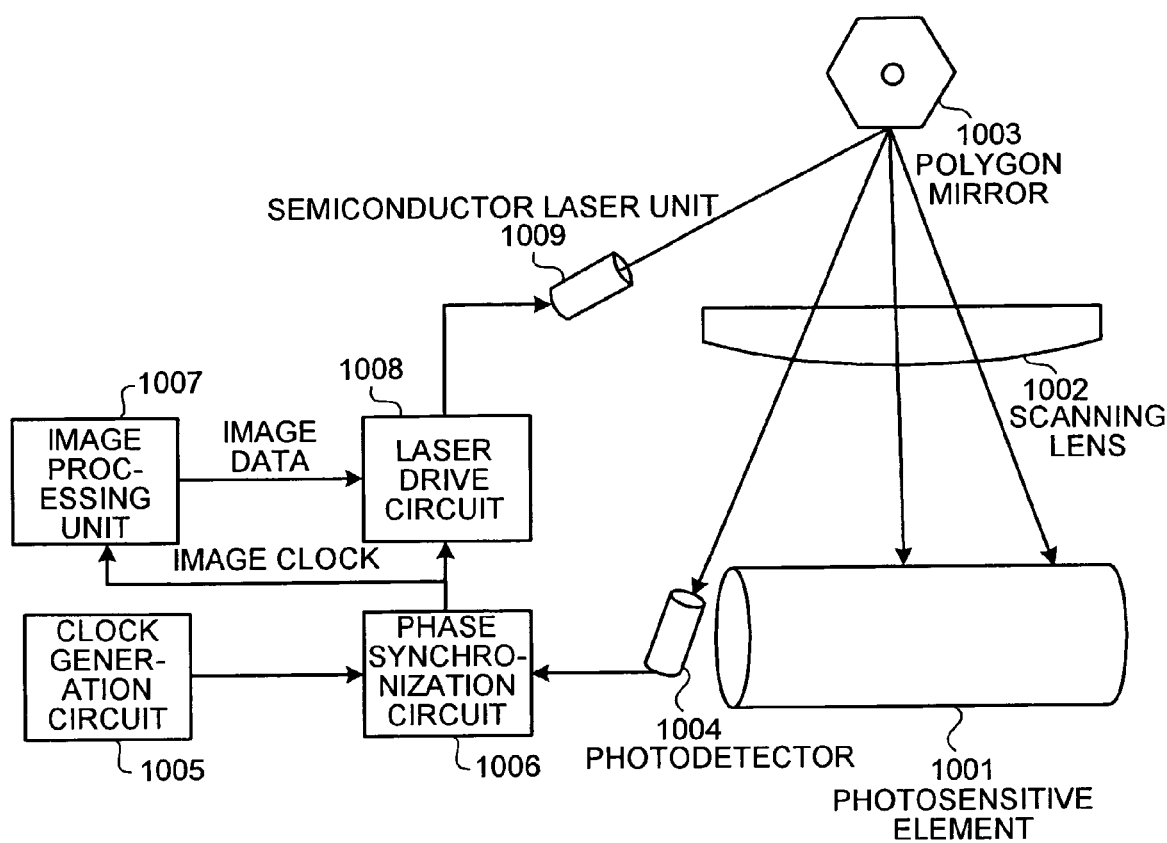
FIG. 28 is a general schematic diagram of a conventional image forming apparatus.

FIG. 27 is a block diagram of a hardware configuration of each image forming apparatus according to the embodiments. The image forming apparatus has such a configuration that a controller 1210 and an engine 1260 are connected to each other through a PCI (Peripheral Component Interconnect) bus. The controller 1210 controls the whole of the image forming apparatus and image reading, and also controls information processing, image processing, and input through an operation unit (not shown). The engine 1260 is a process engine connectable to the PCI bus, and includes the pixel clock generator 111 and the modulation data generator 113 which are main portions of each image forming apparatus according to the embodiments. The process engine is an image information processing engine which includes a portion of image information processing such as error diffusion and gamma conversion on, for example, acquired image data.

The controller 1210 includes a central processing unit (CPU) 1211, a northbridge (NB) 1213, a system memory (MEM-P) 1212, a southbridge (SB) 1214, a local memory (MEM-C) 1217, an ASIC (Application Specific Integrated Circuit) 1216, and a hard disk drive (HDD) 1218, and the northbridge 1213 and the ASIC 1216 are connected by an AGP (Accelerated Graphics Port) bus 1215. The MEM-P 1212 includes a ROM (Read Only Memory) 1212a and a RAM (Random Access Memory) 1212b.

The CPU 1211 controls the overall image forming apparatus, and has a chipset which includes the NB 1213, the MEM-P 1212, and the SB 1214. The CPU 1211 communicates with other devices through the chipset.

The NB 1213 is a bridge for connecting the CPU 1211 to the MEM-P 1212, the SB 1214, and AGP 1215, and includes a memory controller that controls read/write from/to the MEM-P 1212, a PCI master, and an AGP target.

The MEM-P 1212 is system memory used as a storage memory for programs and data and as an expansion memory for programs and data, and includes the ROM 1212a and the RAM 1212b. The ROM 1212a is a read only memory used as a storage memory for programs and data. The RAM 1212b is a writable and readable memory used as an expansion memory for programs and data and as an image drawing memory upon image information processing.

The SB 1214 is a bridge for connecting the NB 1213 to the PCI bus and peripheral devices. The SB 1214 is connected to the NB 1213 through the PCI bus, and the PCI bus is connected with a network interface (I/F) or the like.

The ASIC 1216 is an IC (Integrated Circuit) for multimedia information management which includes a hardware element for multimedia information management, and serves as a bridge connecting between the AGP 1215, the PCI bus, the HDD 1218, and the MEM-C 1217.

The ASIC 1216 is used for connecting a USB (Universal Serial Bus) 1240, an IEEE (Institute of Electrical and Electronics Engineers 1394) interface 1250, and a FCU (facsimile control unit) 1230 to the PCI target and the AGP master, and an arbiter (ARB), a memory controller for controlling the MEM-C 1217, a plurality of DMACs (Direct Memory Access Controllers) for performing rotation of image data by a hardware logic or the like, which form the main part of the ASIC 1216, and the engine 1260, through the PCI bus.

The MEM-C 1217 is a local memory used as an image buffer for transmission and a code buffer. The HDD 1218 is a storage that stores image data, programs, font data, and forms.

The AGP 1215 is a bus interface for graphics accelerator card proposed for speed-up of graphical processing. Direct access to the MEM-P 1212 with high throughput allows speed-up of the graphics accelerator card.

A keyboard 1220 connected to the ASIC 1216 accepts an operation input from an operator and transmits input operation information accepted to the ASIC 1216.

A part of pixel clock generation function, pulse modulation function, and image formation function executed by each image forming apparatus according to the embodiments may be provided by recording them as programs in a file in an installable form or executable form, in a computer-readable recording medium. More specifically, the programs include a pixel clock generating program, a pulse modulating program, and an image forming program, and the recording medium includes compact disk (CD)-ROM, Flexible Disk (FD), CD-R (rewritable), and DVD (Digital Versatile Disk).

Furthermore, if the functions executed by each image forming apparatus according to the embodiments using the programs such as the pixel clock generating program, the pulse modulating program, and the image forming program may be stored in a computer connected to a network such as the Internet, and the programs may be provided by being downloaded through the network. Moreover, the programs may be provided or distributed through the network such as the Internet.

The pixel clock generation function, the pulse modulation function, and the image formation function executed by each image forming apparatus according to the embodiments are configured as a module including the units or part of the units (the high frequency clock generator 1, the first edge detector 2, the second edge detector 3, the frequency divider 4, the comparator 5, the filter 6, the frequency calculator 7, the high frequency clock generator 51, the first edge detector 52, the counting unit 54, the pixel clock output unit 58, the modulation pattern generator 92, the serializer 93, the pixel clock generator 111, the image processor 112, the modulation data generator 113, the laser driver 114, the pixel clock generator 118, the modulation data generator 119, the synchronization signal separator 126, and the image processor 133). Actual hardware may also be configured in such a manner that the CPU (processor) fetches the image processing program and the image forming program from the ROM to execute them, the units are thereby loaded on a main storage device, and the system controller, the image processor, copier application, printer application, the pixel clock generating program, the pulse modulating program, and the image forming program are generated on the main storage device.

INDUSTRIAL APPLICABILITY

The pixel clock generator, the pulse modulator, and the image forming apparatus according to the present invention are useful for image forming technology.

The invention claimed is:

1. A pixel clock generator comprising:
a multiphase clock generator that generates multiphase clocks in which phases are mutually shifted from each other by a phase difference T/P, where T is a cycle and P is number of the phases;
a comparator that detects a time interval between a first synchronization signal and a second synchronization signal, compares the detected time interval with a target value, and outputs an error between the detected time interval and the target value;
a frequency calculator that calculates a set value of a pixel clock frequency based on the error output from the comparator, and outputs a frequency specification signal for specifying the pixel clock frequency based on a calculated set value;
a counting unit that sets the phase difference T/P as a unit time based on the frequency specification signal, and calculates a rising time and a falling time of the pixel clock by counting number of the unit times;
a pixel clock output unit that generates the pixel clock based on the rising time and the falling time of the pixel clock calculated by the counting unit, with reference to the multiphase clocks; and
a frequency divider that generates an internal clock in which one of the multiphase clocks is divided by Q, where Q a positive integer, wherein
the counting unit calculates the rising time and the falling time by counting based on the internal clock generated by the frequency divider and by calculating addition or subtraction of a fraction that is below a cycle of the internal clock.

2. The pixel clock generator according to claim 1, wherein the counting unit calculates the rising time using a set pulse that is a pulse for setting the rising time of the pixel clock based on the internal clock and phase information of the set pulse indicating the fraction below the internal clock, and calculates the falling time using a reset pulse that is a pulse for setting the falling time of the pixel clock based on the internal clock and phase information of the reset pulse indicating the fraction below the internal clock.

3. The pixel clock generator according to claim 2, wherein the pixel clock output unit generates the pixel clock by setting the set pulse with rising of a pixel clock by a pulse obtained by delaying the set pulse based on the phase information of the set pulse, and by setting the reset pulse with falling of a pixel clock by a pulse obtained by delaying the reset pulse based on the phase information of the reset pulse, with reference to the multiphase clocks.

4. The pixel clock generator according to claim 1, wherein the comparator includes,
a synchronization information generator that generates first synchronization information in which the first synchronization signal is represented by a first synchronization pulse based on the internal clock and phase information of the first synchronization pulse indicating a fraction below the internal clock, and second synchronization information in which the second synchronization signal is represented by a second synchronization pulse based on the internal clock and phase information of the second synchronization pulse indicating a fraction below the internal clock,
a first error detector that counts number of pixel clocks, which is a number of rising times of the pixel clock supplied from the counting unit, between the first synchronization pulse and the second synchronization pulse generated by the synchronization information generator, and obtains a pixel clock cycle error between a count value and the target value that is set by a target number for the number of pixel clocks,
a second error detector that obtains a phase error from each of the pieces of the phase information of the first synchronization pulse and the second synchronization pulse and count information of the pixel clock supplied from the counting unit, and
an error calculator that converts the pixel clock cycle error obtained by the first error detector and the phase error obtained by the second error detector into an error in units of the phase difference T/P, and outputs the converted error.

5. An image forming apparatus that forms an image by driving a light source with a pulse modulation signal that is pulse modulated according to image data based on a pixel clock generated by a pixel clock generator and scanning a light flux output from the light source on a medium to be scanned, wherein the pixel clock generator includes,
a multiphase clock generator that generates multiphase clocks in which phases are mutually shifted from each other by a phase difference T/P, where T is a cycle and P is number of the phases,
a comparator that detects a time interval between a first synchronization signal and a second synchronization signal, compares the detected time interval with a target value, and outputs an error between the detected time interval and the target value,
a frequency calculator that calculates a set value of a pixel clock frequency based on the error output from the comparator, and outputs a frequency specification signal for specifying the pixel clock frequency based on a calculated set value,
a counting unit that sets the phase difference T/P as a unit time based on the frequency specification signal, and calculates a rising time and a falling time of the pixel clock by counting number of the unit times,
a pixel clock output unit that generates the pixel clock based on the rising time and the falling time of the pixel clock calculated by the counting unit, with reference to the multiphase clocks, and
a frequency divider that generates an internal clock in which one of the multiphase clocks is divided by Q, where Q a positive integer, wherein
the counting unit calculates the rising time and the falling time by counting based on the internal clock generated by the frequency divider and by calculating addition or subtraction of a fraction that is below a cycle of the internal clock.

6. The image forming apparatus according to claim 5, comprising two optical detectors arranged along a scanning line of the light flux, wherein
signals detected by the two optical detectors are used as the first synchronization signal and the second synchronization signal.

7. An image forming apparatus that forms an image by driving a light source with a pulse modulation signal that is pulse modulated according to image data based on a pixel clock generated by a pixel clock generator and scanning a light flux output from the light source on a medium to be scanned, wherein the pixel clock generator includes,
a multiphase clock generator that generates multiphase clocks in which phases are mutually shifted from each other by a phase difference T/P, where T is a cycle and P is number of the phases,
a comparator that detects a time interval between a first synchronization signal and a second synchronization signal, compares the detected time interval with a target value, and outputs an error between the detected time interval and the target value, a frequency calculator that calculates a set value of a pixel clock frequency based on the error output from the comparator, and outputs a frequency specification signal for specifying the pixel clock frequency based on a calculated set value, a counting unit that sets the phase difference T/P as a unit time based on the frequency specification signal, and calculates a rising time and a falling time of the pixel clock by counting number of the unit times, a pixel clock output unit that generates the pixel clock based on the rising time and the falling time of the pixel clock calculated by the counting unit, with reference to the multiphase clocks, and an optical scanner that scans the medium to be scanned with a periodicity of Nf lines, wherein the frequency calculator includes, a frequency-set-value storing unit that stores a plurality of set values of the pixel clock frequency, a set-value selecting unit that selects a set value by circulating the set values stored in the frequency-set-value storing unit for each of the first synchronization signal and the second synchronization signal, a frequency-specification-signal converting unit that converts the set value selected by the set-value selecting unit into the frequency specification signal, and a set-value-calculation updating unit that calculates a selected set value based on the error output from the comparator, and updates the set value stored in the frequency-set-value storing unit.

8. The image forming apparatus according to claim 7, wherein the optical scanner includes a polygon mirror having Nf surfaces, and the optical scanner scans the medium to be scanned by rotating the polygon mirror.

9. The image forming apparatus according to claim 7, wherein the set-value-calculation updating unit receives a calculation change signal for specifying whether all the set values of the of the pixel clock frequency are calculated and updated or a particular set value is calculated and updated, and calculates and updates the set values based on the received calculation change signal.

* * * * *